(12) United States Patent
Mishra et al.

(10) Patent No.: US 10,019,406 B2
(45) Date of Patent: Jul. 10, 2018

(54) RADIO FREQUENCY FRONT END DEVICES WITH MASKED WRITE

(71) Applicant: QUALCOMM Incorporated, San Diego, CA (US)

(72) Inventors: Lalan Jee Mishra, San Diego, CA (US); Richard Dominic Wietfeldt, San Diego, CA (US); Helena Deirdre O'Shea, San Diego, CA (US); ZhenQi Chen, Shirley, MA (US); Wolfgang Roethig, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/803,639

(22) Filed: Nov. 3, 2017

(65) Prior Publication Data

US 2018/0060272 A1   Mar. 1, 2018

Related U.S. Application Data

(63) Continuation-in-part of application No. 15/298,071, filed on Oct. 19, 2016.

(Continued)

(51) Int. Cl.
*G06F 13/38* (2006.01)
*G06F 13/42* (2006.01)
(Continued)

(52) U.S. Cl.
CPC ........ *G06F 13/4286* (2013.01); *G06F 13/364* (2013.01); *G06F 13/4022* (2013.01); *G06F 21/85* (2013.01)

(58) Field of Classification Search
CPC .... G06F 13/382; G06F 13/385; G06F 13/387; G06F 13/102; G06F 13/4282; G06F 2213/00
(Continued)

(56) References Cited

U.S. PATENT DOCUMENTS 6,122,189 A * 9/2000 Batra ................ G06F 13/16
                                                   365/120
6,128,728 A  10/2000 Dowling
(Continued)

OTHER PUBLICATIONS

International Search Report and Written Opinion—PCT/US2016/057951—ISA/EPO—May 11, 2017.
(Continued)

*Primary Examiner* — Tim T Vo
*Assistant Examiner* — Kim T Huynh
(74) *Attorney, Agent, or Firm* — Loza & Loza LLP

(57) ABSTRACT

Methods and apparatuses are described that facilitate data communication between a first slave device and a second slave device across a serial bus interface. In one configuration, a master device receives, from a first slave device, a request to send a masked-write datagram to a second slave device via a bus, wherein the masked-write datagram is addressed to a radio frequency front end (RFFE) register of the second slave device. The masked-write datagram includes a mask field identifying at least one bit to be changed in the RFFE register and a data field providing a value of the at least one bit to be changed in the RFFE register. The master device detects whether the first slave device is authorized to send the masked-write datagram to the second slave device and permits the first slave device to send the masked-write datagram to the second slave device if authorization is detected.

28 Claims, 34 Drawing Sheets

Related U.S. Application Data

(60) Provisional application No. 62/348,619, filed on Jun. 10, 2016, provisional application No. 62/245,731, filed on Oct. 23, 2015.

(51) Int. Cl.
*G06F 21/85* (2013.01)
*G06F 13/40* (2006.01)
*G06F 13/364* (2006.01)

(58) Field of Classification Search
USPC .................................. 710/110, 3, 105, 63–74
See application file for complete search history.

(56) References Cited

U.S. PATENT DOCUMENTS

| | | | |
|---|---|---|---|
| 6,542,995 B2 | 4/2003 | Heinrich et al. | |
| 7,694,025 B1* | 4/2010 | Norrie | G06F 3/007 710/3 |
| 8,775,714 B2 | 7/2014 | Leitner et al. | |
| 2009/0150655 A1* | 6/2009 | Kim | G06F 9/30112 712/224 |
| 2010/0228932 A1* | 9/2010 | Bae | G11C 7/1006 711/154 |
| 2012/0021790 A1* | 1/2012 | Kister | H04B 1/18 455/507 |
| 2013/0198427 A1* | 8/2013 | Leitner | G06F 13/4291 710/110 |
| 2013/0242800 A1* | 9/2013 | Gruber | H04B 1/40 370/254 |
| 2014/0094157 A1* | 4/2014 | Nguyen | H04W 88/085 455/418 |
| 2015/0257100 A1* | 9/2015 | Su | H04W 36/0016 455/574 |
| 2016/0037505 A1* | 2/2016 | Cooklev | H04W 84/20 370/329 |
| 2016/0179746 A1* | 6/2016 | Hein | G06F 13/4291 710/105 |
| 2017/0116141 A1 | 4/2017 | Mishra et al. | |

OTHER PUBLICATIONS

MIPI: "MIPI Alliance Specification for RF Front-End Control Interface", MIPI Alliance Specification, vol. Version 1.00.00—May 3, 2010, May 3, 2010 (May 3, 2010), pp. 1-88, XP009194174, pp. 47-55.

MIPI: "MIPI Alliance Specification for RF Front-End Control Interface", MIPI Alliance Specification, vol. Version 1.10—Jul. 26, 2011, Jul. 26, 2011 (Jul. 26, 2011), pp. 1-90, XP009194176, pp. 48-56.

* cited by examiner

| Hex | Description | SSC | SA (4) | Command Frame | | | | | | | | P | Reg-Adrs | Data |
|---|---|---|---|---|---|---|---|---|---|---|---|---|---|---|
| 10 | (Reserved) | | | 0 | 0 | 0 | 1 | 0 | 0 | 0 | 0 | P | Undefined | |
| 11 | (Reserved) | | | 0 | 0 | 0 | 1 | 0 | 0 | 0 | 1 | P | Undefined | |
| 12 | (Reserved) | | | 0 | 0 | 0 | 1 | 0 | 0 | 1 | 0 | P | Undefined | |
| 13 | (Reserved) | | | 0 | 0 | 0 | 1 | 0 | 0 | 1 | 1 | P | Undefined | |
| 14 | (Reserved) | | | 0 | 0 | 0 | 1 | 0 | 1 | 0 | 0 | P | Undefined | |
| 15 | (Reserved) | | | 0 | 0 | 0 | 1 | 0 | 1 | 0 | 1 | P | Undefined | |
| 16 | (Reserved) | | | 0 | 0 | 0 | 1 | 0 | 1 | 1 | 0 | P | Undefined | |
| 17 | (Reserved) | | | 0 | 0 | 0 | 1 | 0 | 1 | 1 | 1 | P | Undefined | |
| 18 | (Reserved) | | | 0 | 0 | 0 | 1 | 1 | 0 | 0 | 0 | P | Undefined | |
| 19 | (Reserved) | | | 0 | 0 | 0 | 1 | 1 | 0 | 0 | 1 | P | Undefined | |
| 1A | (Reserved) | | | 0 | 0 | 0 | 1 | 1 | 0 | 1 | 0 | P | Undefined | |
| 1B | (Reserved) | | | 0 | 0 | 0 | 1 | 1 | 0 | 1 | 1 | P | Undefined | |

RADIO FREQUENCY FRONT END DEVICES WITH MASKED WRITE

CROSS-REFERENCE TO RELATED APPLICATIONS

This application is a continuation-in-part of U.S. Non-Provisional application Ser. No. 15/298,071, entitled "RADIO FREQUENCY FRONT END DEVICES WITH MASKED WRITE" filed on Oct. 19, 2016, which claims priority to and the benefit of U.S. Provisional Application Ser. No. 62/245,731, entitled "RADIO FREQUENCY FRONT END DEVICES WITH MASKED WRITE" filed on Oct. 23, 2015 and U.S. Provisional Application Ser. No. 62/348,619, entitled "RADIO FREQUENCY FRONT END DEVICES WITH MASKED WRITE" filed on Jun. 10, 2016, the entire contents of which are incorporated herein by reference.

BACKGROUND

Field

The present disclosure relates generally to data transfer, and more particularly, to radio frequency front end (RFFE) devices having a masked write operation.

Background

As the mobile device market mushroomed with the development of multifunctional smartphones, cellular communication complexity has increased accordingly. It is now conventional for a radio front end of a mobile device to cover as many as ten or more frequency bands. The radio front end thus requires multiple power amplifiers, diplexers, low-noise amplifiers, antenna switches, filters, and other radio frequency (RF) front end devices to accommodate the radio signaling complexity. These various RF front end devices are in turn controlled by a host or master device such as a radio frequency integrated circuit (RFIC). As the RF front end complexity increased, the need for a standardized protocol to control the many different devices lead to the development of the Mobile Industry Processor Interface (MIPI) RF Front End Control Interface (RFFE) standard.

The RFFE standard specifies a serial bus that includes a clock line and a bidirectional data line. Through the RFFE bus, an RFFE master device may read from, and write to, registers in a plurality of RFFE slave devices so as to control the RF front end devices. The read and write commands are organized in the RFFE standard into protocol messages that may each include an initial sequence start condition (SSC), a command frame, a data payload, and a final bus park cycle (BPC). The protocol messages include register commands, extended register commands, and extended register long commands. The protocol messages may further include broadcast commands. The register, extended register, and extended register long commands (three types of commands) can all be either read or write commands. With regard to the three types of commands, the registers in each of the RFFE slave devices are organized into a 16-bit wide address space (0x0000-0xFFFF in hexadecimal). Each of the three types of commands includes a command frame that addresses a specific RFFE slave device as well as the register address. A command frame in the register command (register command frame) is directed to the registers in the first five bits of an address space (0x00-0x1F) such that only five register address bits are needed. The register command frame is followed by an 8-bit data payload frame. In contrast, an extended register command frame includes eight register address bits and may be followed by up to 16 bytes of data. Finally, an extended register long command frame includes a full 16-bit register address so it can uniquely identify any register in the addressed RFFE slave device. The extended register long command frame may be followed by up to eight bytes of data.

Each of the commands begins with a unique sequence start condition (SSC) that is then followed by a corresponding command frame, some number of data frames, and finally a bus park cycle (BPC) to signal the end of the command. The latency involved with transmitting any of the commands thus depends on the number of bits in its various frames as well as the clocking speed for the RFFE clock line. Under the RFFE protocol, each bit of a transmitted frame corresponds to a period of the clock since the transmission is single data rate (SDR), which corresponds to one bit per clock cycle. For example, an SDR results from transmitting a bit responsive to each rising edge (or to just the falling edges) of the clock. The maximum clocking speed is 52 MHz in the RFFE v2 specification. This clocking rate has increased relative to previous versions of the RFFE protocol and is associated with increased power consumption.

Each of the three types of RFFE commands—extended register, extended register long, and register—may be either a read or a write command. In general, each write command writes a full byte to each specified register. However, it may be the case that the RFFE master device does not need to change all eight bits in a RFFE slave device register. Furthermore, in many devices, more than one master or radio access technology (RAT) component may share control bit(s) in the same RFFE slave device register. To avoid contaminating the bits corresponding to the "other" source that writes to the same register, a "partial write" operation may be desired. In such a partial write operation, the RFFE master device must first perform a read operation on the selected slave device register using the appropriate one of the three command types. The RFFE master device then knows the current state of all the bits in the corresponding RFFE slave device register. The RFFE master device may then issue an RFFE write command using the appropriate one of the three command types in which the data payload for the corresponding slave device register has the bits it is changing while all the remaining bits stay in their current state as determined by the previous read operation. The need for a read operation prior to the partial write operation increases latency that may violate the latency requirements of certain Radio Access Technologies being implemented in the corresponding RF frontend.

Accordingly, there is a need in the art for RFFE messaging with decreased latency for partial write operations.

SUMMARY

Embodiments disclosed herein provide systems, methods, and apparatuses that facilitate the communication of data between slave devices across a serial bus interface. A radio frequency front end front end (RFFE) network is provided in which a slave device may generate masked-write commands and request permission from a master device to issue the masked write commands to other slave devices that do not require any read operations to determine the value of unchanged bits in addressed slave device registers. Each masked-write command may include a mask field or bit index field that identifies bit position(s) of bit(s) to be changed in an addressed slave device register.

In an aspect of the disclosure, a method performed at a master device for facilitating data communication on a bus, includes receiving, from a first slave device, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register, detecting whether the first slave device is authorized to send the masked-write datagram to the second slave device, permitting the first slave device to send the masked-write datagram to the second slave device if authorization is detected, and preventing the first slave device from sending the masked-write datagram to the second slave device if authorization is not detected.

In an aspect, the permitting includes notifying the first slave device that the first slave device is authorized to send the masked-write datagram. In another aspect, the preventing includes notifying the first slave device that the first slave device is not authorized to send the masked-write datagram and/or issuing a bus park cycle on the bus to block the sending of the masked-write datagram.

In an aspect, the mask field further identifies a remaining set of bits to be left unchanged in the RFFE register of the second slave device. In another aspect, the mask field is a bit index field identifying a bit position to be changed in the RFFE register of the second slave device and the data field is a bit value field providing a bit value for the bit position identified in the bit index field.

In another aspect of the disclosure, a master device for facilitating data communication on a bus, includes a bus interface and a processing circuit. The processing circuit is configured to receive, from a first slave device via the bus interface, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register, detect whether the first slave device is authorized to send the masked-write datagram to the second slave device, permit the first slave device to send the masked-write datagram to the second slave device if authorization is detected, and prevent the first slave device from sending the masked-write datagram to the second slave device if authorization is not detected.

In a further aspect of the disclosure, a master device for facilitating data communication on a bus, includes means for receiving, from a first slave device, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register, means for detecting whether the first slave device is authorized to send the masked-write datagram to the second slave device, means for permitting the first slave device to send the masked-write datagram to the second slave device if authorization is detected, and means for preventing the first slave device from sending the masked-write datagram to the second slave device if authorization is not detected.

In an aspect of the disclosure, a method performed at a first slave device for communicating data to a second slave device via a bus, includes generating, at the first slave device, a masked-write datagram to be sent to the second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register, requesting permission from a master device to send the masked-write datagram to the second slave device, detecting whether the permission is granted, sending the masked-write datagram to the second slave device if permitted by the master device, and refraining from sending the masked-write datagram to the second slave device if not permitted by the master device.

In an aspect, the detecting includes receiving a notification from the master device that the first slave device is permitted to send the masked-write datagram. In another aspect, the detecting includes receiving a notification from the master device that the first slave device is not permitted to send the masked-write datagram and/or observing a bus park cycle issued by the master device on the bus to block the sending of the masked-write datagram.

In an aspect, the mask field further identifies a remaining set of bits to be left unchanged in the RFFE register of the second slave device. In another aspect, the mask field is a bit index field identifying a bit position to be changed in the RFFE register of the second slave device and the data field is a bit value field providing a bit value for the bit position identified in the bit index field.

In another aspect of the disclosure, a slave device for communicating data to a second slave device via a bus, includes a bus interface and a processing circuit. The processing circuit is configured generate, at the slave device, a masked-write datagram to be sent to the second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register, request permission from a master device to send the masked-write datagram to the second slave device, detect whether the permission is granted, send the masked-write datagram to the second slave device via the bus interface if permitted by the master device, and refrain from sending the masked-write datagram to the second slave device if not permitted by the master device.

In yet a further aspect of the disclosure, a slave device for communicating data to a second slave device via a bus, includes means for generating, at the slave device, a masked-write datagram to be sent to the second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register, means for requesting permission from a master device to send the masked-write datagram to the second slave device, means for detecting whether the permission is granted, means for sending the masked-write datagram to the second slave device if permitted by the master device, and means for refraining from sending the masked-write datagram to the second slave device if not permitted by the master device.

BRIEF DESCRIPTION OF THE DRAWINGS

FIG. 4 is a diagram illustrating reserved command fields in an RFFE protocol.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Exemplary Apparatus with Multiple IC Device Subcomponents

Figure 1:
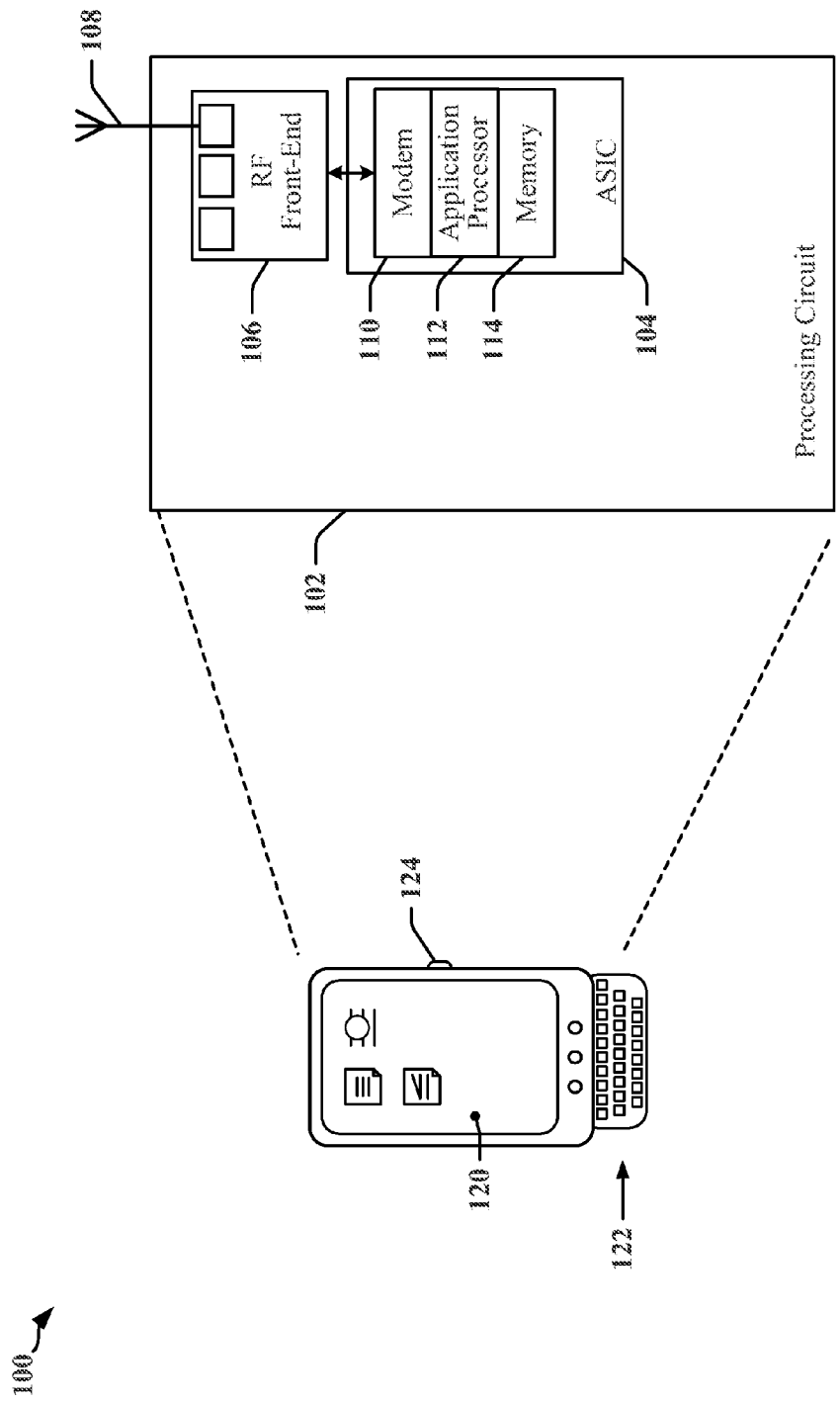
FIG. 1 illustrates an apparatus that includes a RF front end (RFFE) that may be adapted according to certain aspects disclosed herein.

Certain aspects of the invention may be applicable to communications links deployed between electronic devices that include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may be a mobile communication device. The apparatus 100 may include a processing circuit having two or more IC devices 104, 106 that may be coupled using a first communication link. One IC device may be an RF front end device 106 that enables the apparatus to communicate through one or more antennas 108 with a radio access network, a core access network, the Internet and/or another network. The RF front end device 106 may include a plurality of devices coupled by a second communication link, which may include an RFFE bus.

The processing circuit 102 may include one or more application-specific IC (ASIC) devices 104. In one example, an ASIC device 104 may include and/or be coupled to one or more processing devices 112, logic circuits, one or more modems 110, and processor readable storage such as a memory device 114 that may maintain instructions and data that may be executed by a processor on the processing circuit 102. The processing circuit 102 may be controlled by one or more of an operating system and an application programming interface (API) layer that supports and enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Overview of the RFFE Bus

Figure 2:
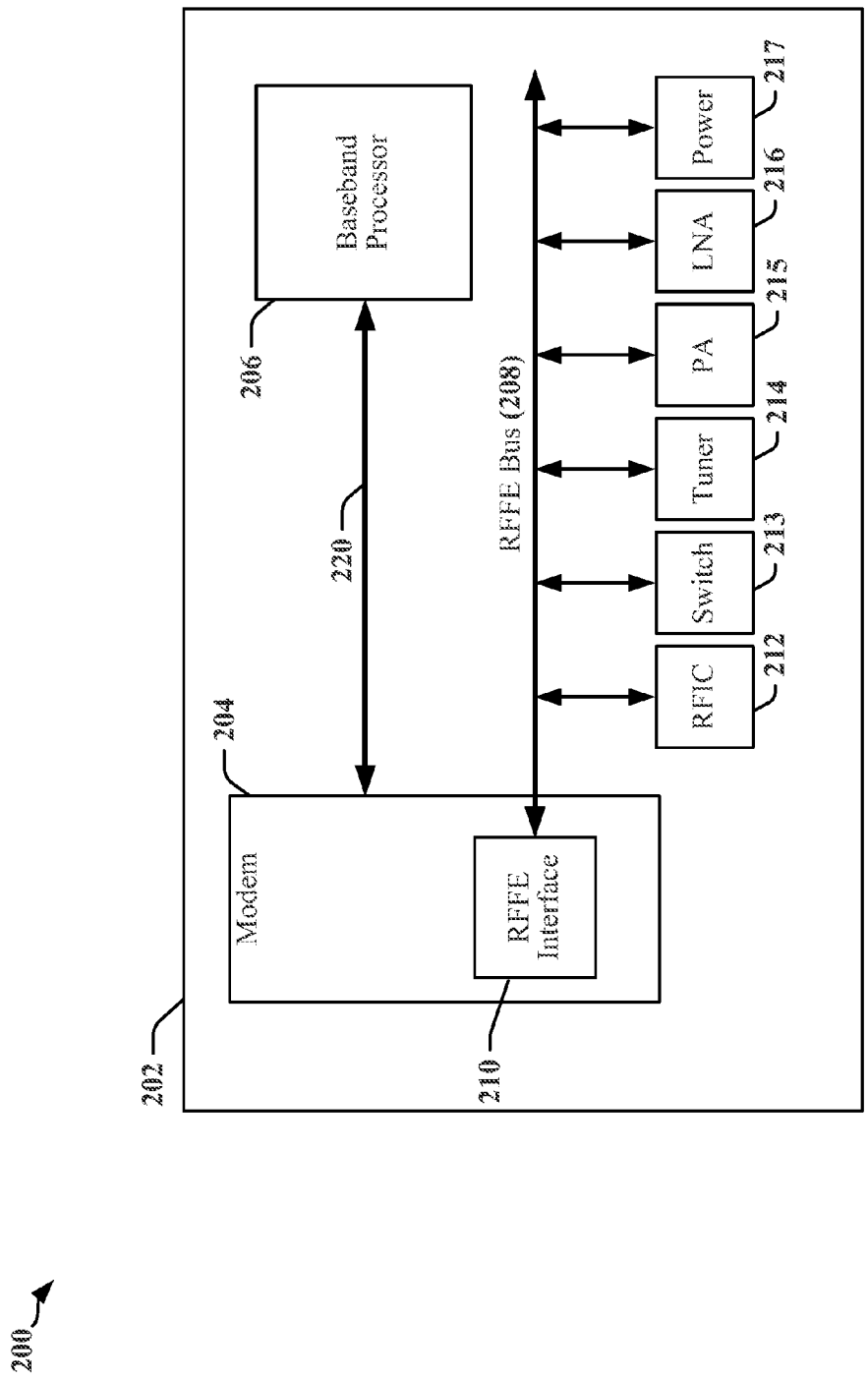
FIG. 2 is a block diagram illustrating a device that employs a RFFE bus to couple various front end devices.

FIG. 2 is a block diagram 200 illustrating an example of a device 202 that employs an RFFE bus 208 to couple various front end devices 212-217. A modem 204 including an RFFE interface 210 may also be coupled to the RFFE bus 208. In various examples, the device 202 may be implemented with one or more baseband processors 206, one or more other communication links 220, and various other buses, devices and/or different functionalities. In the example, the modem 204 may communicate with a baseband processor 206, and the device 202 may be embodied in one or more of a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smart watch, a health or fitness tracker, eyewear, etc.), an appliance, a sensor, a security device, a vending machine, a smart meter, a drone, a multicopter, or any other similar functioning device.

The RFFE bus 208 may be coupled to an RF integrated circuit (RFIC) 212, which may include one or more controllers, and/or processors that configure and control certain aspects of the RF front end. The RFFE bus 208 may couple the RFIC 212 to a switch 213, an RF tuner 214, a power amplifier (PA) 215, a low noise amplifier (LNA) 216, and a power management module 217.

In an example, the baseband processor 206 may be a master device. The master device/baseband processor 206 may drive the RFFE bus 208 to control the various front end devices 212-217. During transmission, the baseband processor 206 may control the RFFE interface 210 to select the power amplifier 215 for a corresponding transmission band. In addition, the baseband processor 206 may control the switch 213 so that the resulting transmission may propagate from an appropriate antenna. During reception, the baseband processor 206 may control the RFFE interface 210 to receive from the low noise amplifier 216 depending on the corresponding transmission band. It will be appreciated that numerous other components may be controlled through the RFFE bus 208 in this fashion such that the device 202 is merely representative and not limiting. Moreover, other devices such as the RFIC 212 may serve as an RFFE master device in alternative embodiments.

Figure 3:
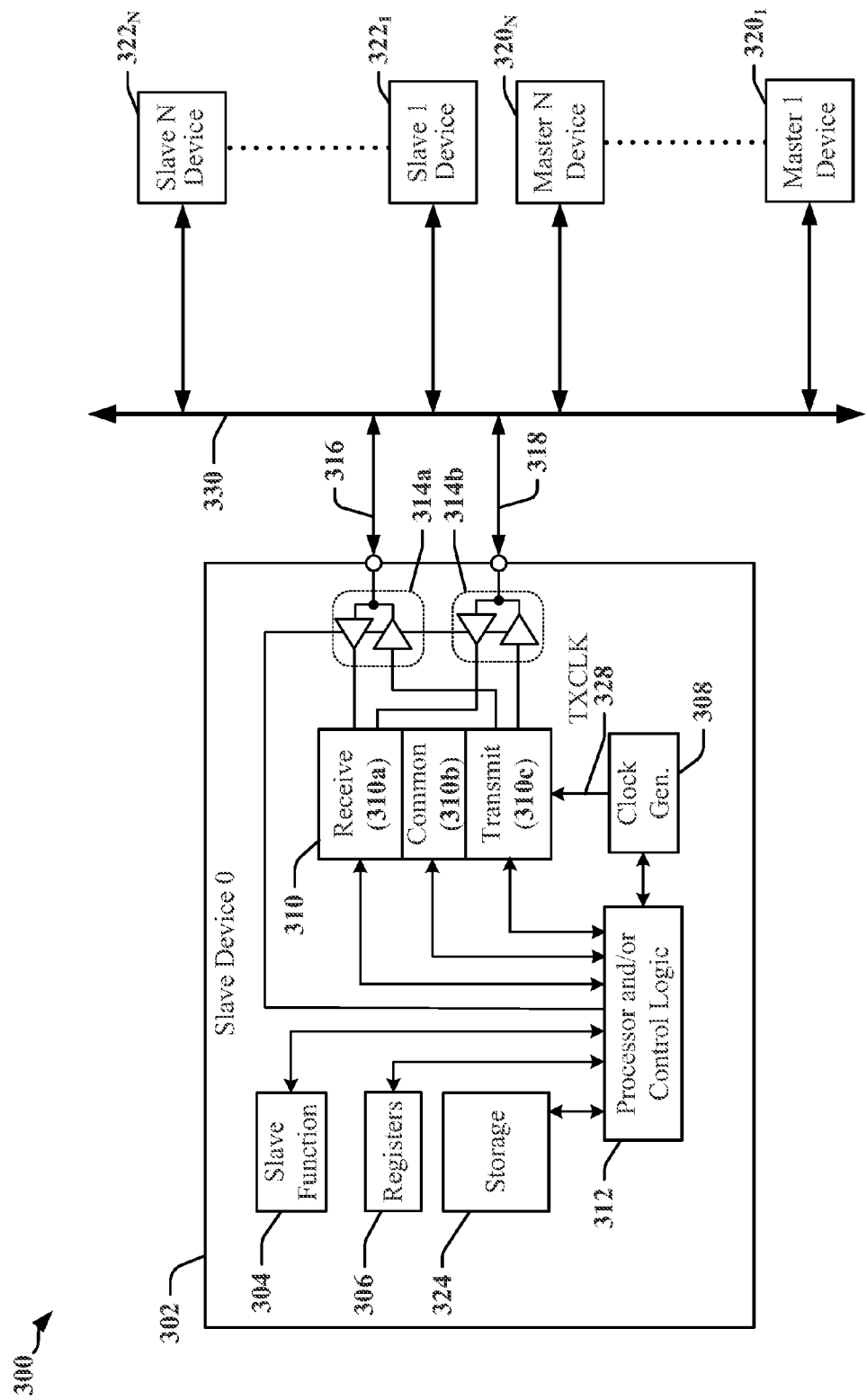
FIG. 3 illustrates an example of a system architecture for an apparatus employing a data link between IC devices according to certain aspects disclosed herein.

FIG. 3 is a block schematic diagram illustrating an example of an architecture for a device 300 that may employ an RFFE bus 330 to connect bus master devices $320_1$-$320_N$ and slave devices 302 and $322_1$-$322_N$. The RFFE bus 330 may be configured according to application needs, and access to multiple buses 330 may be provided to certain of the devices $320_1$-$320_N$, 302, and $322_1$-$322_N$. In operation, one of the bus master devices $320_1$-$320_N$ may gain control of the bus and transmit a slave identifier (slave address) to identify one of the slave devices 302 and $322_1$-$322_N$ to engage in a communication transaction. Bus master devices $320_1$-$320_N$ may read data and/or status from slave devices 302 and $322_1$-$322_N$, and may write data to memory or may configure the slave devices 302 and $322_1$-$322_N$. Configuration may involve writing to one or more registers or other storage on the slave devices 302 and $322_1$-$322_N$.

In the example illustrated in FIG. 3, a first slave device 302 coupled to the RFFE bus 330 may respond to one or more bus master devices $320_1$-$320_N$, which may read data from, or write data to the first slave device 302. In one example, the first slave device 302 may include or control a power amplifier (see the PA 215 in FIG. 2), and one or more bus master devices $320_1$-$320_N$ may from time-to-time configure a gain setting at the first slave device 302.

The first slave device 302 may include RFFE registers 306 and/or other storage devices 324, a processing circuit and/or control logic 312, a transceiver 310 and an interface including a number of line driver/receiver circuits 314a, 314b as needed to couple the first slave device 302 to the RFFE bus 330, e.g., via a serial clock line (SCLK) 316 and a serial data line (SDATA) 318. The processing circuit and/or control logic 312 may include a processor such as a state machine, sequencer, signal processor or general-purpose processor. The interface may be implemented using the state machine. Alternatively, the interface may be implemented in software on a suitable processor if included in the first slave device 302. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TX-CLK) signal 328 may be provided to the transmitter 310c, where the TXCLK signal 328 can be used to determine data transmission rates.

The RFFE bus 330 is typically implemented as a serial bus in which data is converted from parallel to serial form by a transmitter, which transmits the encoded data as a serial bitstream. A receiver processes the received serial bitstream using a serial-to-parallel convertor to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the RFFE bus 330.

To control the slave devices 302 and $322_1$-$322_N$, a master device (e.g., one of master devices $320_1$-$320_N$) either writes or reads to RFFE registers within the slave devices, e.g., the RFFE registers 306 within the first slave device 302. The RFFE registers 306 may be arranged according to an RFFE register address space that ranges from a zeroth (0) address to a 65535 address. In other words, each slave device may include up to 65,536 registers. To address such a number of registers, 16 register address bits for each of the slave devices 302 and $322_1$-$322_N$ are required. The master device may read from or write to the registers 306 in each slave device using one of the three types of commands discussed above (register command, extended register command, or extended register long command). For example, the register command addresses only the first 32 registers 306 in the address space for each of the slave devices 302 and $322_1$-$322_N$. In this fashion, the register command requires only five register address bits. In contrast, the extended register command may initially access up to the first 256 registers in each of the slave devices 302 and $322_1$-$322_N$. A corresponding 8-bit register address for the extended register command acts as a pointer in that the data payload for the extended register command may include up to 16 bytes. A corresponding read or write operation for an extended register command may thus extend across 16 registers starting from the register identified by the 8-bit register address. The extended register long command includes a 16-bit register address which may act as a pointer to any of the possible 65,536 registers in each slave device. The data payload for an extended register long command may include up to eight bytes so that the corresponding read or write operation for the extended register long command may extend across eight registers starting from the register identified by the 16-bit address. In an aspect of the disclosure, up to 15 slave devices may be coupled to one RFFE bus. If a front end includes more than 15 slave devices, additional RFFE busses may be provided.

Exemplary Masked Write Operating Environment for Radio Frequency Front End (RFFE) Devices In an aspect of the disclosure, it is not uncommon for a register to be shared by two slave devices or components. For example, a pair of LNAs may each be configured by four of the eight bits in a shared slave register. The sharing of a register by two constrained slave devices may be referred to as a "highly integrated" register mapping. Configuring just one of the slave devices requires a partial write operation in that only four bits of an 8-bit slave register are written to rather than all eight bits. The remaining bits for the other slave device sharing the register must be left unchanged. A master device may include a "shadow register" that may be loaded with the contents of a corresponding slave device through a read operation. The master device may write to the slave device by using the contents of the shadow register and merely changing the corresponding bits for the particular slave device and leaving the remaining bits for the shared register unaffected. Such a partial write operation may be referred to as a "read-modify-write" operation in that it involves a read of the slave device register, a modification of just the selected bits, and a write operation to the entire eight bits in the slave register using the modified bits and unmodified bits from the corresponding shadow register. The use of a shadow register not only necessitates a prior read in case of a multi-master configuration but also adds to silicon area due to the additional register space requirement.

FIG. 4 is a diagram illustrating reserved command fields in an RFFE protocol. To reduce the latency of conventional RFFE commands over the RFFE bus 208 for partial write operations (read-modify-write operations), new command frames are provided herein that invoke a masked write mode of transmission. To provide these new command frames, the reserved command frames established by the RFFE protocol are exploited. In that regard, the RFFE protocol reserved at least 12 command frames 400 as shown in FIG. 4 ranging from a reserved command frame at hexadecimal 10 to a reserved command frame at hexadecimal 1B. Each reserved command frame begins with a sequence start condition (SSC) followed by a four-bit slave device address (SA (4)) as shown in FIG. 4. Each reserved command is eight bits long. For example, the reserved command at hexadecimal 10 comprises the eight bits 00010000. All of the reserved commands are followed by a parity bit P followed by address (Reg-Adrs) and data frames for reserved purposes.

Figure 5:
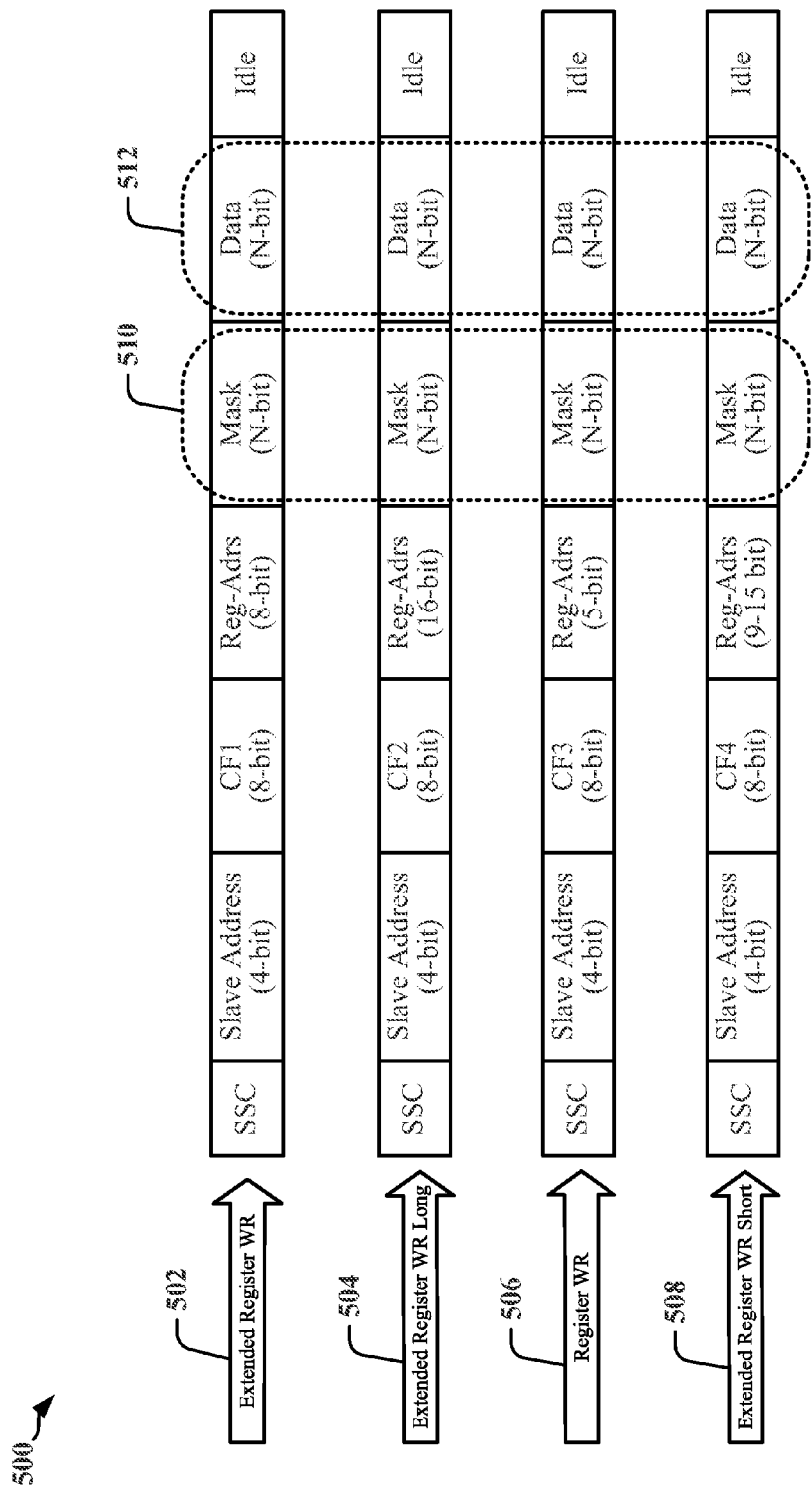
FIG. 5 is a diagram illustrating four masked write commands that include N-bit mask fields in accordance with an aspect of the disclosure.

FIG. 5 is a diagram illustrating four masked write commands that include N-bit mask fields in accordance with an aspect of the disclosure. To signal the use of a masked write operation, four of the reserved command frames (designated as command frames CF1 through CF4) may be used to identify masked write RFFE commands 500 as shown in FIG. 5. In these masked write commands 500, a mask N-bit field 510 identifies the masked bits that will be left unchanged by the masked write operation and the unmasked bits that will be changed by the masked write operation. N is the number of bits in the corresponding registers. The following discussion will assume that N=8, but it will be appreciated that other register widths may be used in alternative implementations. A data N-bit field 512 provides the binary value of the unmasked bits. For example, an extended register masked write command (Extended Register WR) 502 begins with an SSC followed by a 4-bit slave device address (Slave Address (4-bit)). An 8-bit command frame CF1 taken from one of the reserved command frames 400 discussed with regard to FIG. 4 identifies command 502 to the receiving slave device interface. An 8-bit address (Reg-Adrs (8-bit)) identifies the address of the register in the corresponding slave device for the extended register mask write operation. An idle symbol (bus park cycle) completes command 502.

An extended register long masked write command (Extended Register WR Long) 504 also begins with an SSC and the four-bit slave address (Slave Address (4-bit)), but is followed by a unique reserved command frame CF2. Command frame CF2 is followed by a sixteen-bit register address (Reg-Adrs (16-bit)), mask N-bit field 510, data N-bit field 512, and the idle symbol. A register masked write command (Register WR) 506 also begins with an SSC and the slave address field (Slave Address (4-bit)) followed by a unique reserved command frame CF3. The reserved command frame CF3 is followed by a 5-bit register address (Reg-Adrs (5-bit)), mask N-bit field 510, data N-bit field 512, and the idle symbol. Finally, an extended register short masked write command (Extended Register WR Short) 508 is analogous to the extended register long masked write command 502 except that it uses a unique reserved command code CF4 and a 6-bit, 7-bit, or 9-15 bit register address (Reg-Adrs (9-15 bit)). The number of register bits may be established during a device initialization phase.

Figure 6:
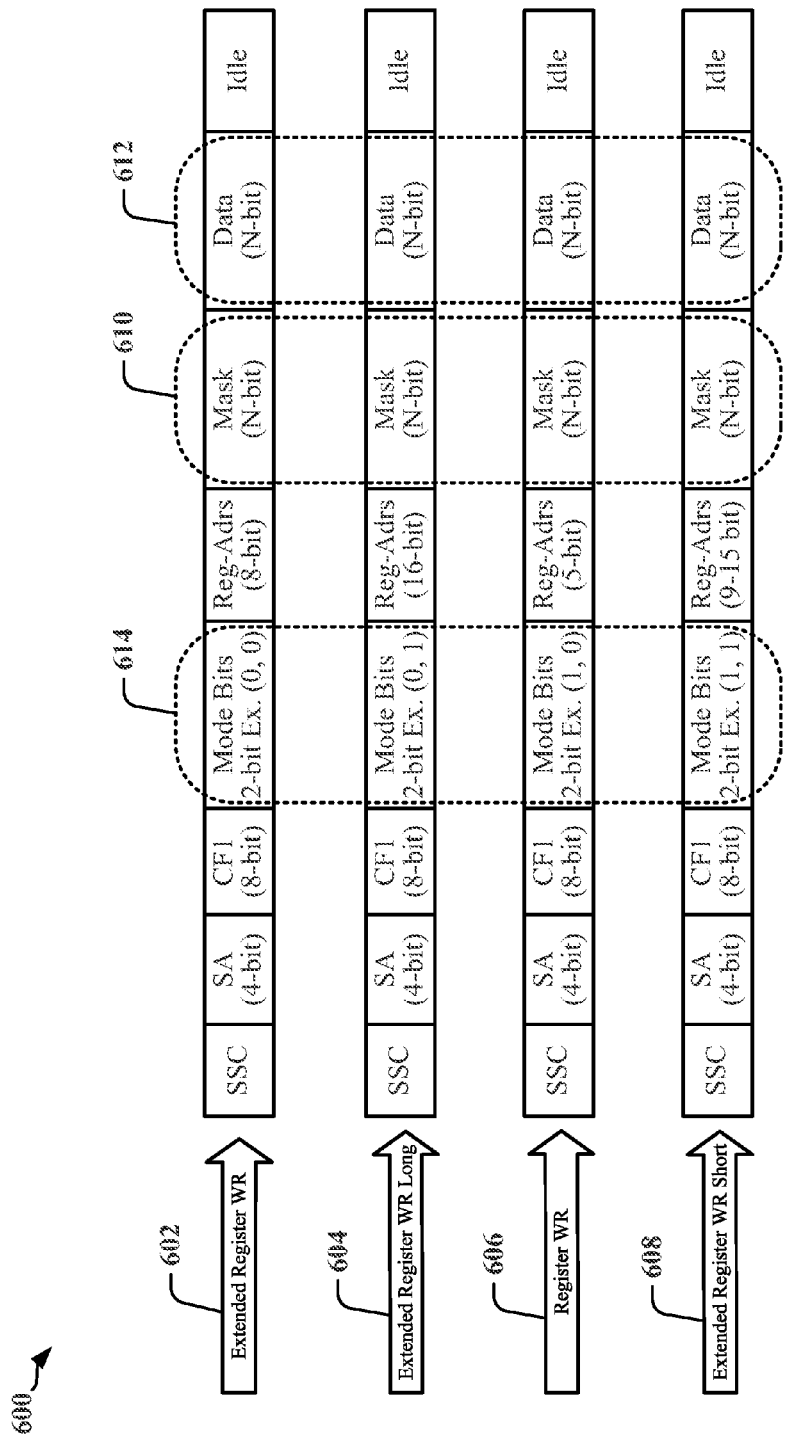
FIG. 6 is a diagram illustrating a modification of the masked write commands of FIG. 5 in which a single reserved command field is employed in accordance with an aspect of the disclosure.

FIG. 6 is a diagram illustrating a modification of the masked write commands of FIG. 5 in which a single reserved command field is employed in accordance with an aspect of the disclosure. Rather than use four of the reserved command frames as in FIG. 5, FIG. 6 depicts use of a single reserved command frame for generic masked write commands 600. All of the commands 600 begin with an SSC and a slave address (Slave Address (4-bit)) and end with an idle symbol. A generic extended register masked write command (Extended Register WR) 602 uses a reserved command frame CF1 that is followed by a 2-bit mode field 614 having, for example, a value of (0, 0) to signify that an extended register masked write operation is intended. Analogous to command 502, command 602 includes an 8-bit register address, mask N-bit field 610, data N-bit field 612, and an idle symbol. A generic extended register long masked write command (Extended Register WR Long) 604 uses the same reserved command field CF1. Command 604 also includes the 2-bit mode field 614 having a value of, for example, (0, 1) to signify that an extended register long masked write operation is intended. Analogous to command 604, command 604 includes a 16-bit register address, mask N-bit field 610, data N-bit field 612, and an idle symbol. A generic register masked write command (Register WR) 606 also includes the reserved command field CF1 and a 2-bit mode field 614 having a value of, for example, (1, 0) to identify that a register masked write operation is intended at the following 5-bit register address using mask N-bit field 610 and data N-bit field 612. Finally, a generic register short masked write command (Extended Register WR Short) 608 is analogous to the generic extended register long masked command 508 except that it uses a 9-15 bit register address (Reg-Adrs (9-15 bit)).

Figure 7:
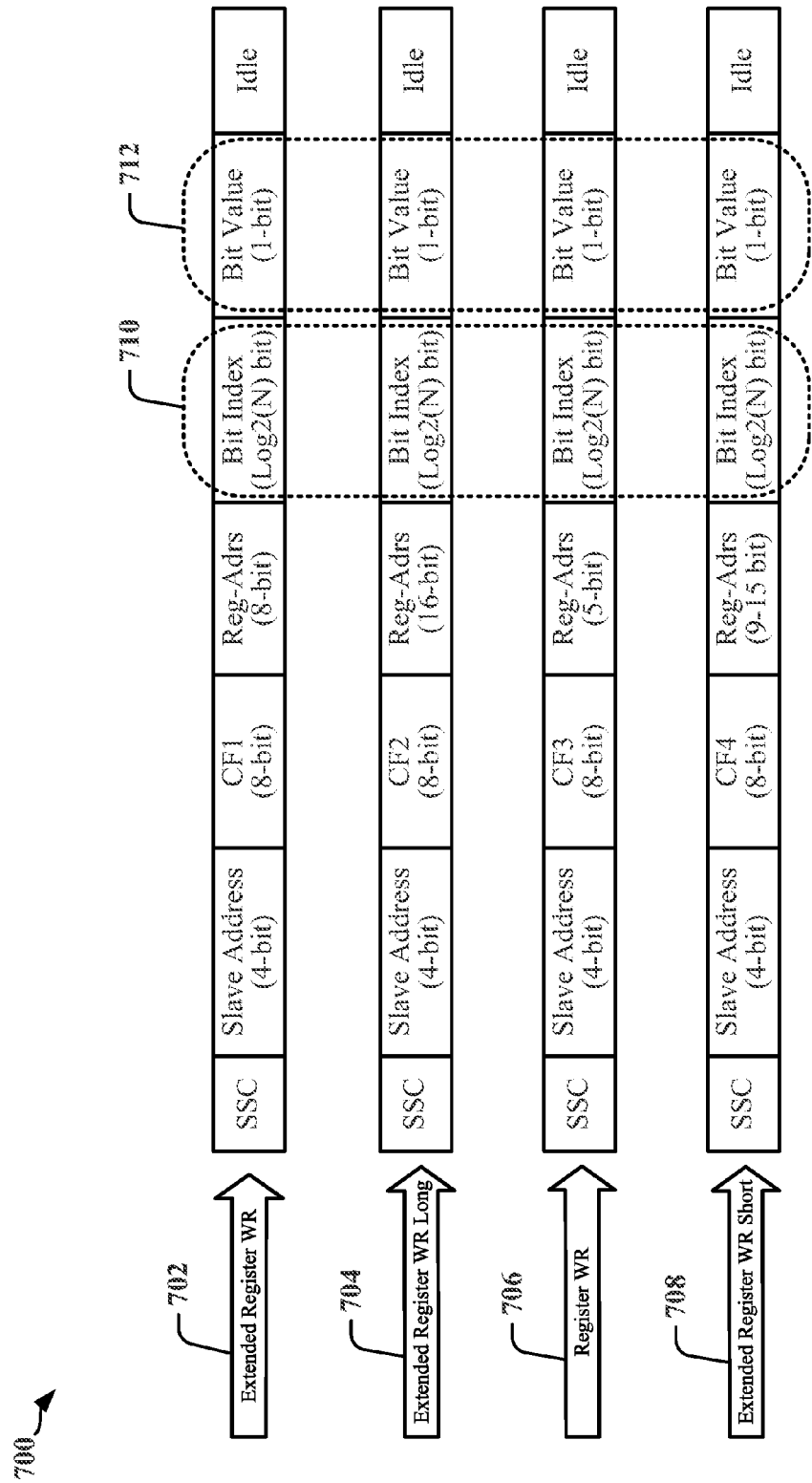
FIG. 7 is a diagram illustrating four masked write commands that include a bit index identifying the bit position of a bit to be changed in accordance with an aspect of the disclosure.

FIG. 7 is a diagram illustrating four masked write commands that include a bit index identifying the bit position of a bit to be changed in accordance with an aspect of the disclosure. Should only one bit need to be changed in the addressed register, mask N-bit field 510 may be replaced by a log 2(N) bit index 710 as shown in FIG. 7 that uniquely identifies the bit position that will be written to in the corresponding N-bit wide slave device register. A bit value field 712 identifies what the bit value should be for the bit position identified by the bit index 710. It will be appreciated that the bit index 710 and the bit value field 712 may be used in an embodiment in which each masked command includes a unique reserved command field analogously as discussed with regard to FIG. 5. Thus, an extended register indexed masked write command (Extended Register WR) 702 is analogous to the command 502 except that fields 510 and 512 are replaced by fields 710 and 712, respectively. Similarly, an extended register long indexed masked write command (Extended Register WR Long) 704 is analogous to the command 504, a register indexed masked write command (Register WR) 706 is analogous to the command 506, and an extended register short indexed masked write command (Extended Register WR Short) 708 is analogous to the command 508, but for the replacements of the fields 510 and 512 with the fields 710 and 712, respectively.

Figure 8:
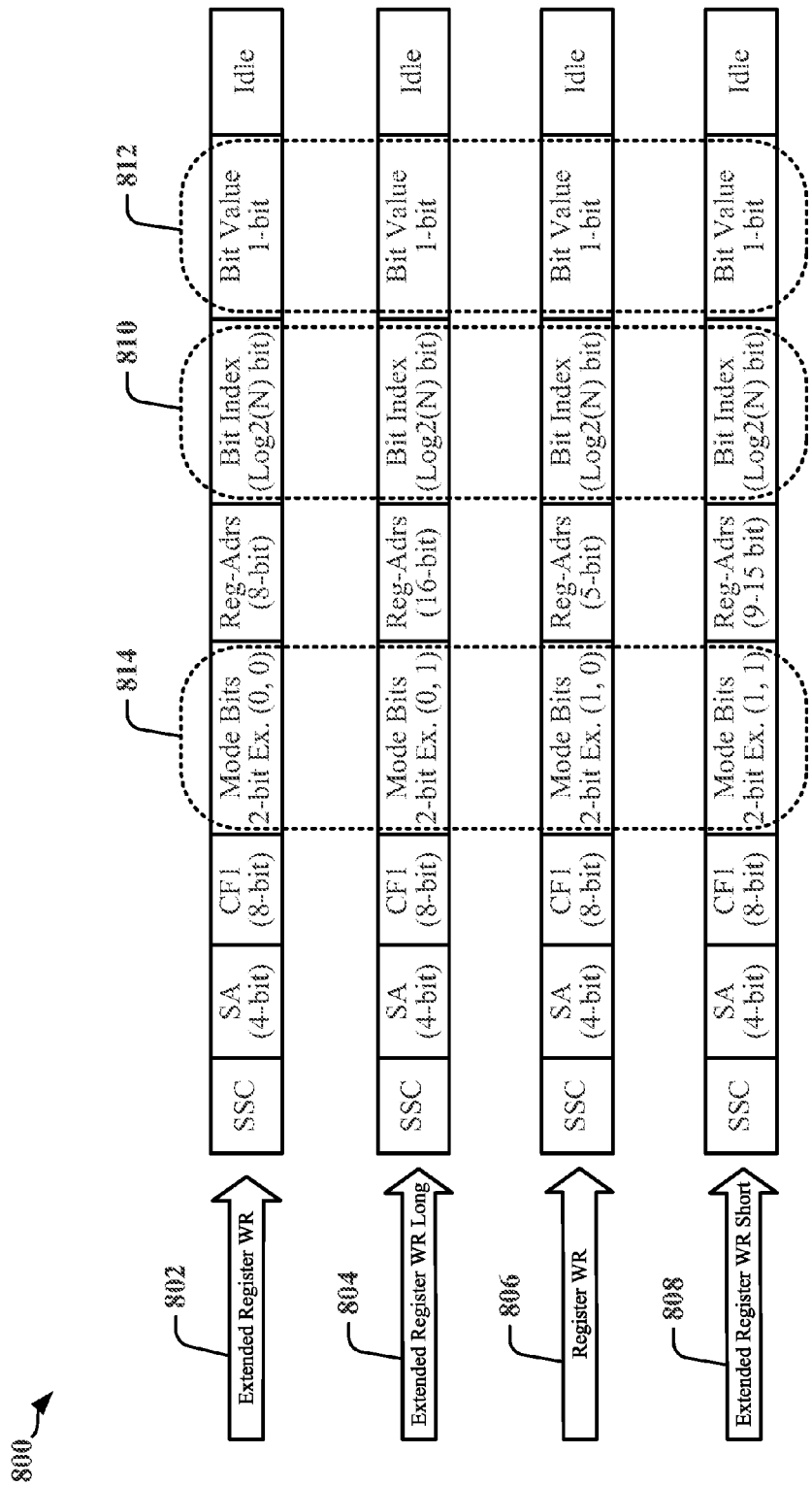
FIG. 8 is a diagram illustrating a modification of the masked write commands of FIG. 7 in which a single reserved command field is employed in accordance with an aspect of the disclosure.

FIG. 8 is a diagram illustrating a modification of the masked write commands of FIG. 7 in which a single reserved command field is employed in accordance with an aspect of the disclosure. The number of reserved commands may be reduced even further as shown in FIG. 8 for generic indexed masked write commands 800 that use a common reserved command field CF1. To identify the type of indexed masked write operation, commands 800 each include a 2-bit mode field 814 as discussed with regard to FIG. 6. Thus, a generic extended register indexed masked write command (Extended Register WR) 802 is analogous to the command 602 except that fields 610 and 612 are replaced by fields 810 and 812, respectively. Similarly, a generic extended register long indexed masked write command (Extended Register WR Long) 804 is analogous to the command 604, a generic register indexed masked write command (Register WR) 806 is analogous to the command 606, and a generic extended register short indexed masked write command (Extended Register WR Short) 808 is analogous to the command 608, but for the replacements of the fields 610 and 612 with the fields 810 and 812, respectively. In an aspect of the disclosure, a master device interface and a slave device interface are configured to implement the masked write operations discussed herein. This is quite advantageous because the conventional need for a read-modify-write sequence (i.e., read the contents of a register prior to a partial write operation) on the RFFE is eliminated. In this fashion, the disclosed masked write operations advantageously reduce bus communication latency.

The techniques discussed above either makes use of multiple command frames (a.k.a. command codes) or a single command-frame in conjunction with mode bits. While the above techniques may be preferred in some implementations, an additional technique will be described below that has the added benefits of address-paging and burst-write. Although the technique is rooted in RFFE enhancement, its application is not specifically limited to an RFFE bus, but may be applicable to other bus architectures as well.

As described above, an RFFE masked-write command may provide one N-bit mask field and one N-bit control data field per datagram. Each datagram has a fixed overhead of 15 clock cycles (SSC: 1-cycle, USID: 4-cycles, command code: 8-cycles, parity: 1-cycle, BPC: 1-cycle). However, for applications where multiple mask-and-data bits are to be sent, use of multiple datagrams may not be the most optimal way to transfer data due to an associated overhead. Moreover, the number of unused reserved RFFE command codes are limited. Thus, use of multiple reserved command codes to indicate burst transfer may not be appropriate since there may not be enough command codes available, even to accommodate, for example, eight bursts of masked-write commands.

Therefore, there is a need for a new technique to enable write access in the entire RFFE UDR space that provides support for a burst mode while using one command code. Accordingly, aspects of the present disclosure provide for a page addressing scheme and burst writing scheme with mask-and-data byte pairs.

In the page addressing scheme, a slave device has a 1-byte base-address-register. For example, the base-address register may contain a value of 0x00 in hexadecimal. A master device maintains a copy of the slave device's base-addressregister at the master device in a shadow register. The master device prepares a datagram based on a 16-bit address, i.e., 1-byte most significant byte (MSB) and 1-byte least significant byte (LSB), but will only send the 1-byte LSB in the masked-write datagram. Prior to sending the masked-write datagram, the master device will compare the 1-byte MSB of the 16-bit address to a current copy of the slave device's base-address-register in the shadow register. If the value of the slave device's base-address-register does not match the 1-byte MSB of the 16-bit address, the master device will first set (or update) the base address on the slave device (to change the page) in order to match the 1-byte MSB of the 16-bit address. The master device may use a register-write access command or any other type of write access command (as preferred) to perform the slave device base address change before sending the masked-write datagram. The page is only to be changed when a page mismatch is detected prior to datagram transmission. The master device may further update the shadow register with the updated slave device base address.

In the burst writing scheme with mask-and-data byte pair, the slave device has a 1-byte masked-write burst length register. For example, the burst length register may have a value of 0x01 in hexadecimal. The master device maintains a copy of the slave device's masked-write burst length register at the master device in the shadow register. The master device prepares the datagram based on a mask-and-data pair burst length (e.g., number of mask-and-data byte pairs) specified, but will not send the burst length in the masked-write datagram. Prior to sending the masked-write datagram, the master device will compare the specified burst length with a current copy of the slave device's masked-write burst length in the shadow register. If the value of the slave device's masked-write burst length does not match the specified burst length, the master device will first set (or update) the masked-write burst length on the slave device in order to match the specified burst length. The master device may use a register-write access command or any other type of write access command (as preferred) to perform the slave device masked-write burst length change before sending the masked-write datagram. The masked-write burst length is only to be changed when a burst length mismatch is detected prior to datagram transmission. The master device may further update the shadow register with the updated masked-write burst length. Accordingly, when the 1-byte MSB of the 16-bit address matches the base address of the slave device and the specified burst length matches the masked-write burst length of the slave device, the master device may send the masked-write datagram to the slave device.

Figure 9:
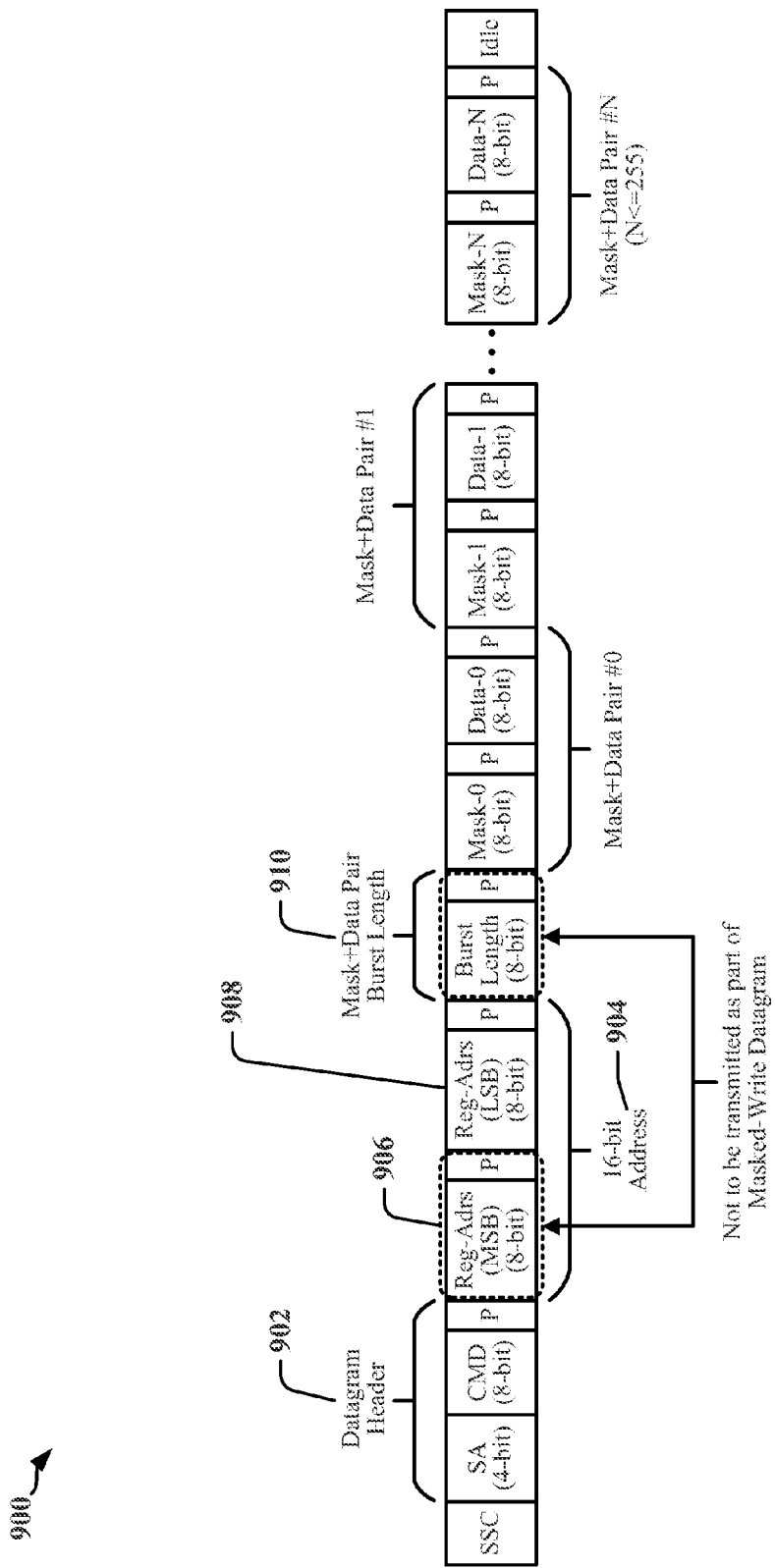
FIG. 9 is a diagram illustrating an example packet structure supporting a 16-bit address space and N-pairs of mask-and-data bytes.

FIG. 9 is a diagram illustrating an example packet structure 900 supporting a 16-bit address space and N-pairs of mask-and-data bytes. Referring to FIG. 9, a datagram header 902 may include a slave address having four bits (SA(4)), a command frame having eight bits (CMD(8)), and a parity bit P. A master device may prepare a datagram based on a 16-bit address 904 having 1-byte most significant byte (MSB) 906 and 1-byte least significant byte (LSB) 908. The master device will only send the 1-byte LSB 908 in the masked-write datagram. Thus, the 1-byte MSB 906 will not be transmitted as part of the masked-write datagram. Moreover, the master device may prepare the datagram based on a specified mask-and-data pair burst length 910. The mask-and-data pair burst length 910 indicates the number of mask-and-data byte pairs (e.g., Mask+Data pair #0, Mask+Data pair #1, . . . , Mask+Data pair #N) in the payload. The mask-and-data pair burst length 910 will not be transmitted as part of the masked-write datagram.

Figure 10:
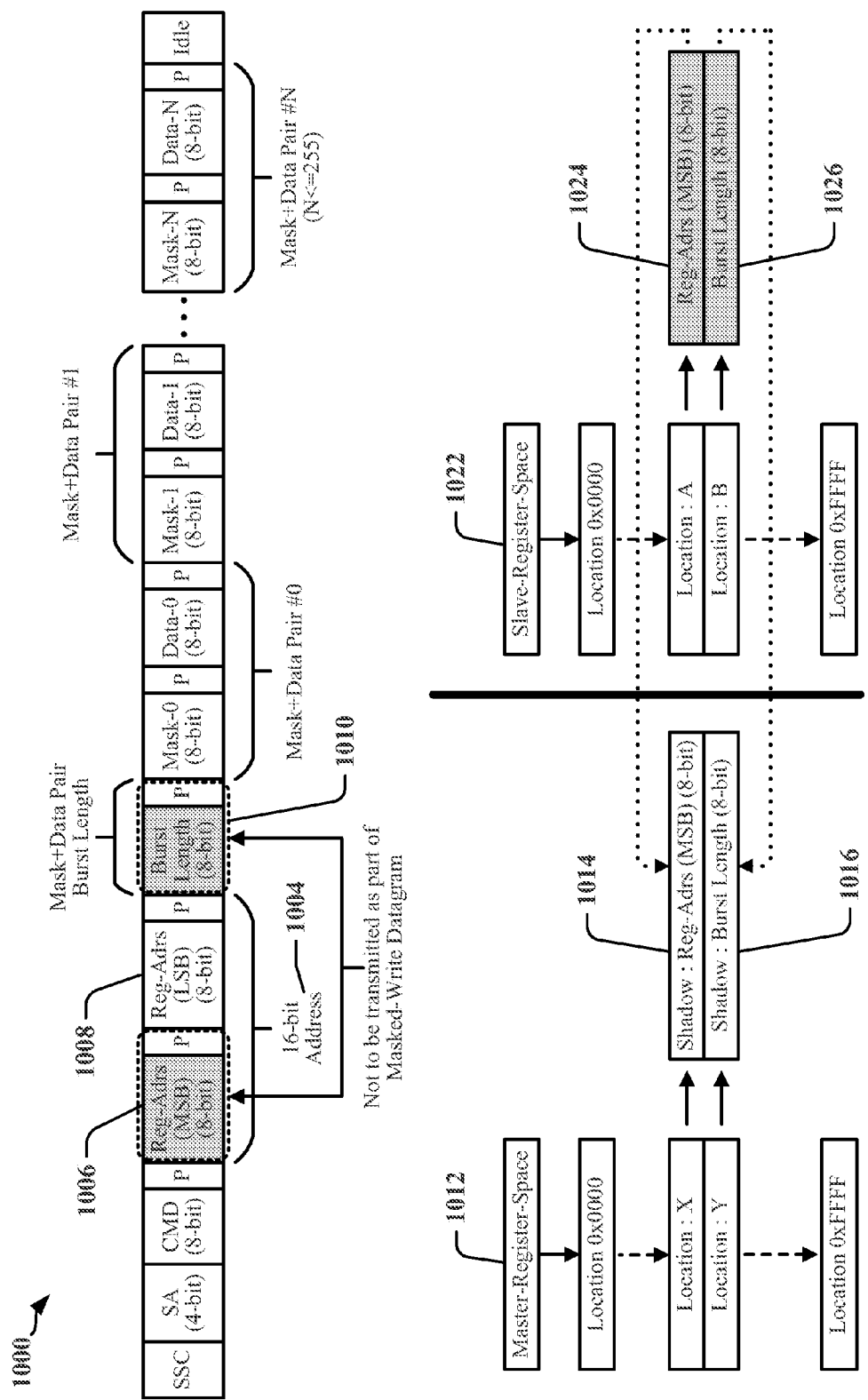
FIG. 10 is a diagram illustrating an example datagram in a transmit buffer.

FIG. 10 is a diagram illustrating an example datagram 1000 in a transmit buffer. In the page addressing scheme, a slave device 1022 has a 1-byte base-address-register 1024. A master device 1012 maintains a copy of the slave device's base-address-register 1024 at the master device in a shadow register 1014. The master device 1012 prepares a datagram 1000 based on a 16-bit address 1004 having 1-byte most significant byte (MSB) 1006 and 1-byte least significant byte (LSB) 1008, but will only send the 1-byte LSB 1008 in the masked-write datagram 1000. Prior to sending the masked-write datagram 1000, the master device 1012 will compare the 1-byte MSB 1006 to a current copy of the slave device's base-address-register 1024 in the shadow register 1014. If the slave device's base-address-register 1024 does not match the 1-byte MSB 1006, the master device 1012 will first set (or update) the base address 1024 on the slave device 1022 (to change the page) in order to match the 1-byte MSB 1006. The master device 1012 may further update the shadow register 1014 with the updated slave device base address 1024.

In the burst writing scheme with mask-and-data byte pair, the slave device 1022 has a 1-byte masked-write burst length register 1026. The master device 1012 maintains a copy of the slave device's masked-write burst length register 1026 at the master device 1012 in a shadow register 1016. The master device 1012 prepares the datagram 1000 based on a mask-and-data pair burst length 1010 (e.g., number of mask-and-data byte pairs) specified, but will not send the burst length 1010 in the masked-write datagram 1000. Prior to sending the masked-write datagram 1000, the master device will compare the specified burst length 1010 with a current copy of the slave device's masked-write burst length 1026 in the shadow register 1016. If the slave device's masked-write burst length 1026 does not match the specified burst length 1010, the master device 1012 will first set (or update) the masked-write burst length 1026 on the slave device 1022 in order to match the specified burst length 1010. The master device 1012 may further update the shadow register 1016 with the updated masked-write burst length 1026. Accordingly, when the 1-byte MSB 1006 matches the base address 1024 of the slave device 1022 and the specified burst length 1010 matches the masked-write burst length 1026 of the slave device 1022, the master device 1012 may send the masked-write datagram 1000 to the slave device 1022.

Figure 11:
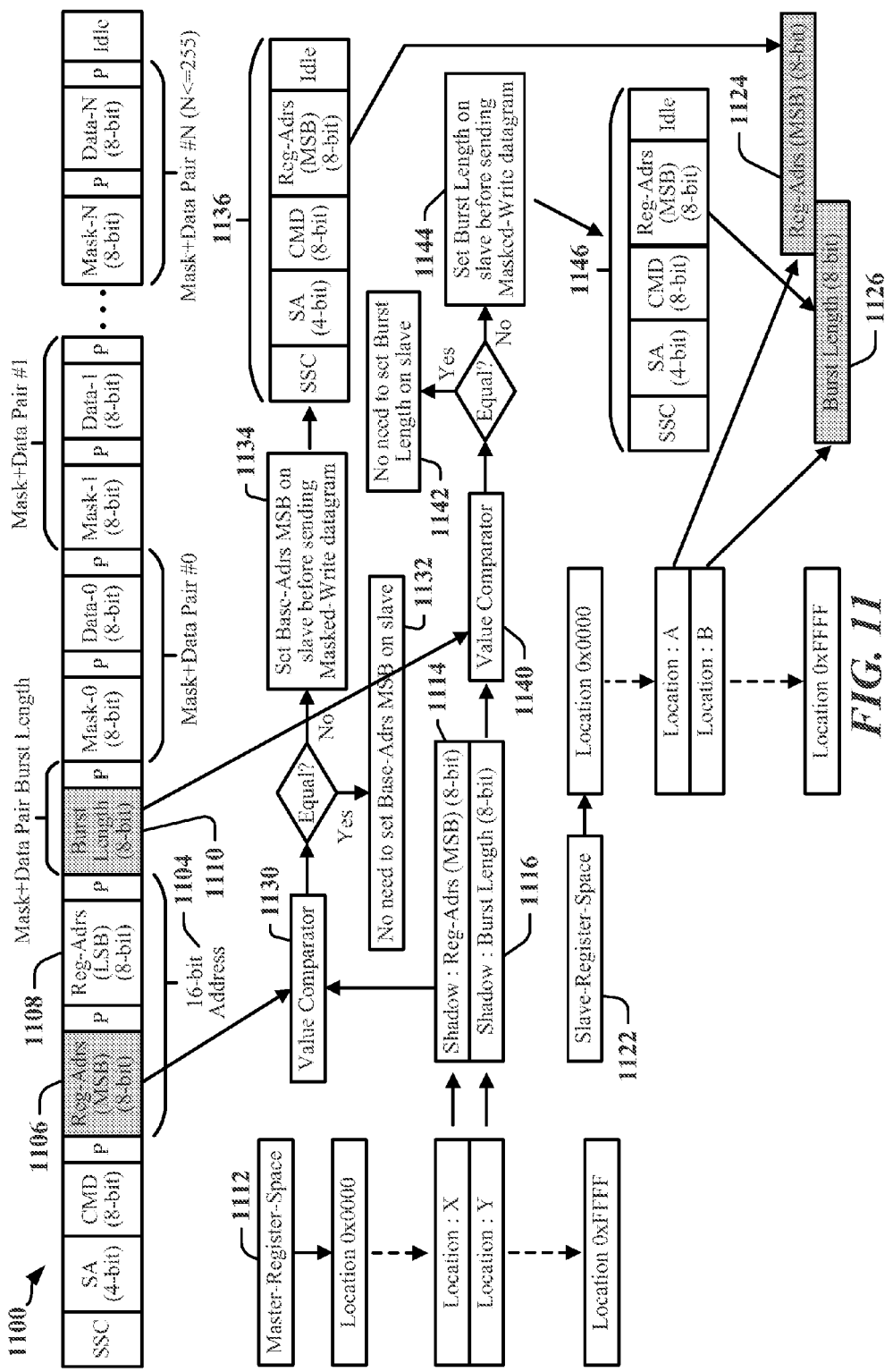
FIG. 11 is a diagram illustrating an example operation for a datagram in a transmit buffer.

FIG. 11 is a diagram illustrating an example operation for a datagram 1100 in a transmit buffer. In the page addressing scheme, a slave device 1122 has a 1-byte base-address-register 1124. A master device 1112 maintains a copy of the slave device's base-address-register 1124 at the master device in a shadow register 1114. The master device 1112 prepares a datagram 1100 based on a 16-bit address 1104 having 1-byte most significant byte (MSB) 1106 and 1-byte least significant byte (LSB) 1108, but will only send the 1-byte LSB 1108 in the masked-write datagram 1100. Prior to sending the masked-write datagram 1100, the master device 1112 will compare 1130 the 1-byte MSB 1106 to a current copy of the slave device's base-address-register 1124 in the shadow register 1114. If the slave device's base-address-register 1124 in the shadow register 1114 is equal to the 1-byte MSB 1006 (see 1132), then there is no need to set (or update) the base address 1124 on the slave device 1122. If the slave device's base-address-register 1124 does not equal the 1-byte MSB 1106 (see 1134), the master device 1112 will set (or update) the base address 1124 on the slave device 1222 (to change the page) in order to match the 1-byte MSB 1106. The master device 1112 may use a register-write access command 1136 or any other type of write access command (as preferred) to perform the slave device base address change before sending the masked-write datagram. The page is only to be changed when a page mismatch is detected prior to datagram transmission. The master device 1112 may further update the shadow register 1114 with the updated slave device base address 1124.

In the burst writing scheme with mask-and-data byte pair, the slave device 1122 has a 1-byte masked-write burst length register 1126. The master device 1112 maintains a copy of the slave device's masked-write burst length register 1126 at the master device 1112 in a shadow register 1116. The master device 1112 prepares the datagram 1100 based on a mask-and-data pair burst length 1110 (e.g., number of mask-and-data byte pairs) specified, but will not send the burst length 1110 in the masked-write datagram 1100. Prior to sending the masked-write datagram 1100, the master device will compare 1140 the specified burst length 1110 with a current copy of the slave device's masked-write burst length 1126 in the shadow register 1116. If the slave device's masked-write burst length 1126 in the shadow register 1116 is equal to the specified burst length 1110 (see 1142), then there is no need to set (or update) the masked-write burst length 1126 on the slave device 1122. If the slave device's masked-write burst length 1126 does not equal the specified burst length 1110 (see 1144), the master device 1112 will set (or update) the masked-write burst length 1126 on the slave device 1122 in order to match the specified burst length 1110. The master device may use a register-write access command 1146 or any other type of write access command (as preferred) to perform the slave device masked-write burst length change before sending the masked-write datagram. The masked-write burst length is only to be changed when a burst length mismatch is detected prior to datagram transmission. The master device 1112 may further update the shadow register 1116 with the updated masked-write burst length 1126. Accordingly, when the 1-byte MSB 1106 matches the base address 1124 of the slave device 1122 and the specified burst length 1110 matches the masked-write burst length 1126 of the slave device 1122, the master device 1112 may send the masked-write datagram 1100 to the slave device 1122.

In an aspect of the disclosure, a masked-write operation may be performed using an extended register write datagram and/or an extended register long write datagram. Payloads of the datagrams may be used to transmit a number of mask-and-data pairs. Such an operation may be hereinafter referred to as a custom masked-write operation. In an aspect, a normal write datagram may be distinguished from the custom masked-write datagram by defining two bits in a configuration register, as will be described below. Utilization of a write datagram payload for a masked-write purpose is illustrated in FIGS. 12 and 13.

Figure 12:
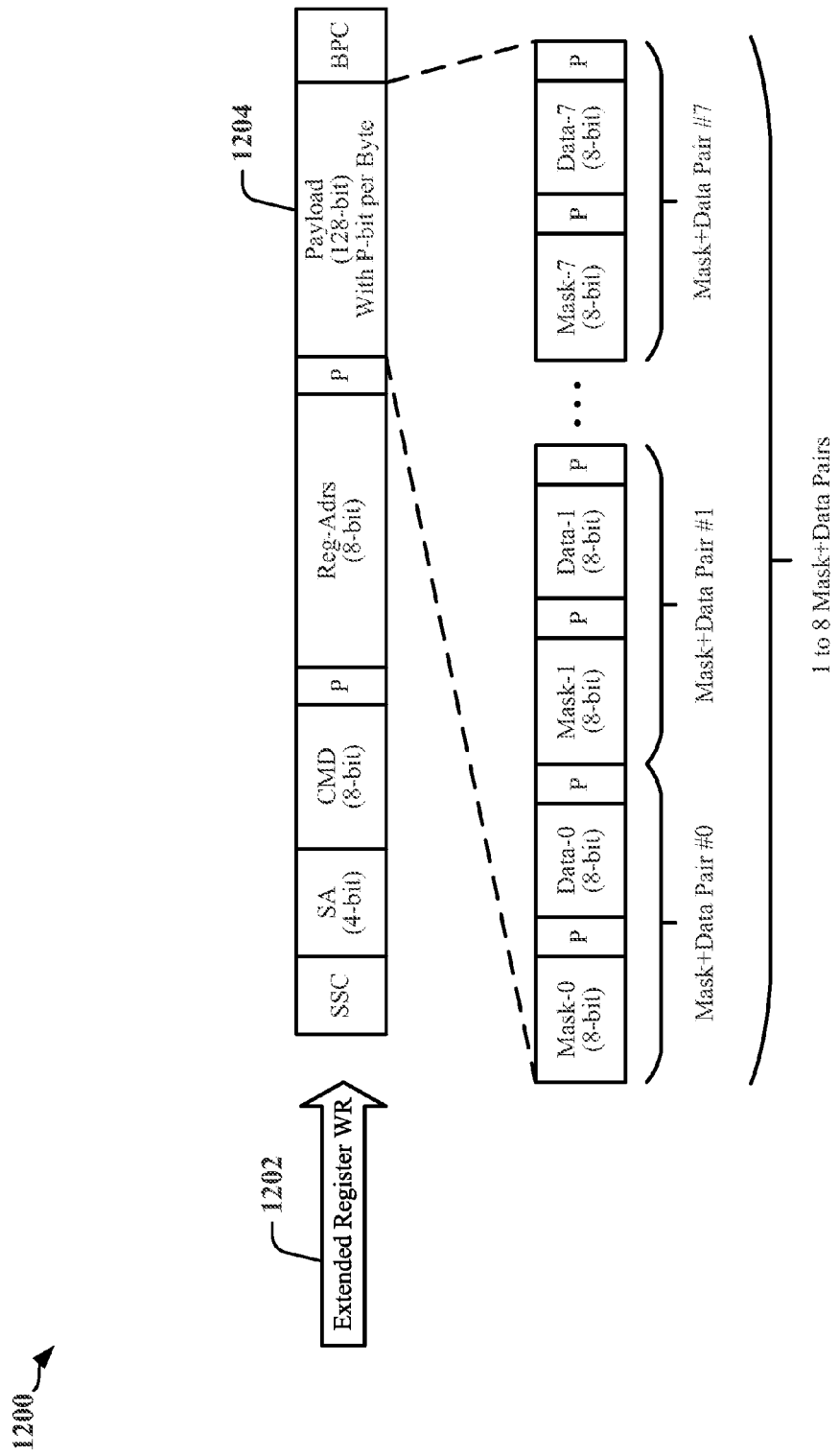
FIG. 12 is a diagram illustrating an example packet structure of an extended register write command supporting a masked-write operation.

FIG. 12 is a diagram illustrating an example packet structure 1200 of an extended register write command 1202 supporting a masked-write operation. FIG. 13 is a diagram illustrating an example packet structure 1300 of an extended register long write command 1302 supporting a masked-write operation.

Figure 13:
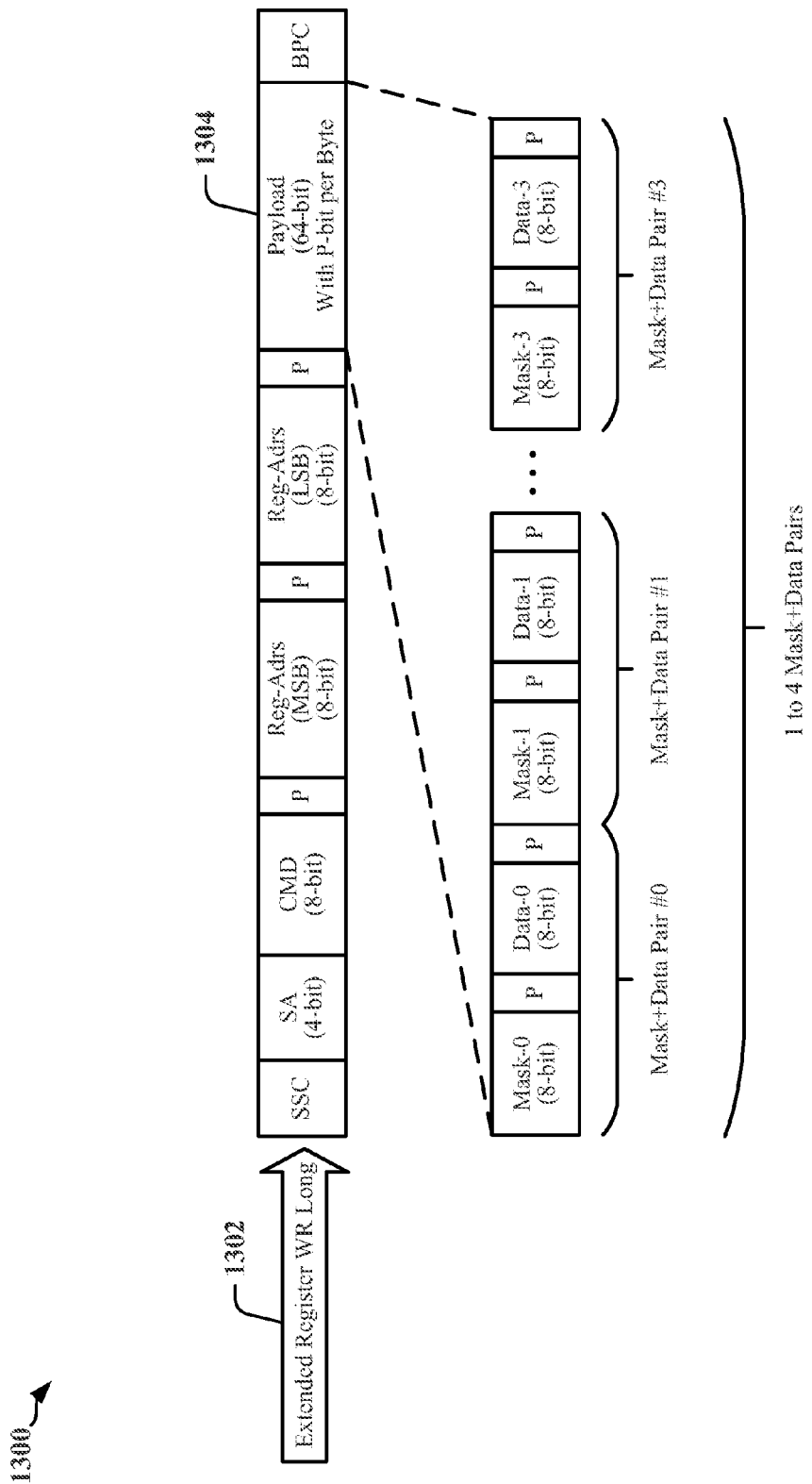
FIG. 13 is a diagram illustrating an example packet structure of an extended register write long command supporting a masked-write operation.

Referring to FIGS. 12 and 13, a custom masked-write operation may make use of the extended register write command 1202 and the extended register long write command 1302 with a condition that the number of bytes in a payload section is specified as an even number to allow transmission of an integer number of mask-and-data byte pairs. A first mask byte (i.e., Mask-0) is located at a first even location (0-th byte) following an address byte in the payload. The first mask byte is followed by a corresponding first data byte (i.e., Data-0), which is located at a first odd location after the address byte. Thus, following the address byte, mask bytes (e.g., Mask-0, Mask-1, Mask-2, etc.) may occupy even locations, while data bytes (e.g., Data-0, Data-1, Data-2, etc.) may occupy odd locations, in the payload.

A maximum number of mask-and-data byte pairs that can be transmitted in a write command is dependent on a maximum number of bytes allowed in a payload. For example, in the extended register write command 1202, a maximum allowed byte count in the payload 1204 is 16 bytes (128 bits). Thus, the extended register write command 1202 may support the transmission of a maximum of 8 mask-and-data byte pairs in one datagram. As shown in FIG. 12, the payload 1204 may include 1 to 8 mask-and-data byte pairs (e.g., Mask+Data pair #0, Mask+Data pair #1, . . . , Mask+Data pair #7). In another example, in the extended register long write command 1302, a maximum allowed byte count in the payload 1304 is 8 bytes (64 bits). Thus, the extended register long write command 1302 may support the transmission of a maximum of 4 mask-and-data byte pairs in one datagram. As shown in FIG. 13, the payload 1304 may include 1 to 4 mask-and-data byte pairs (e.g., Mask+Data pair #0, Mask+Data pair #1, . . . , Mask+Data pair #3).

In an aspect of the disclosure, an 8-bit configuration register may be utilized to provide a control function interface to facilitate the enabling and disabling of the masked-write operation using the extended register write command and/or the extended register long write command. The configuration register may be located within a user defined register space: 0x01 to 0x1C in hexadecimal. For example, register location 0x18 may be used as the configuration register. However, in alternative aspects, it is contemplated that the configuration register may be at any location within an entire register space.

Figure 14:
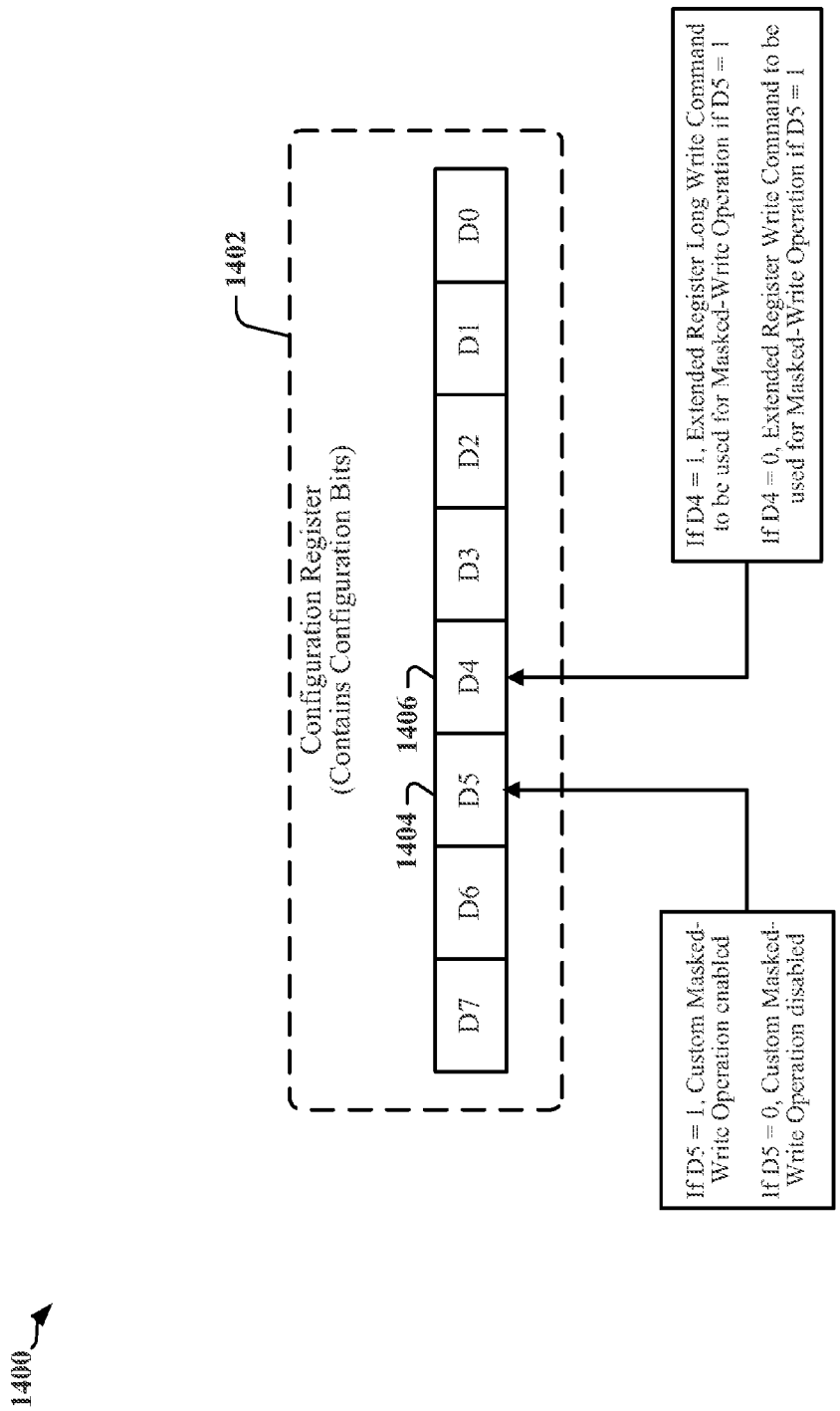
FIG. 14 is a diagram illustrating a bit structure of a configuration register.

FIG. 14 is a diagram illustrating an example bit structure 1400 of a configuration register 1402. As shown, the configuration register 1402 includes eight configuration register bits D7, D6, D5, D4, D3, D2, and D1. In an aspect of the disclosure, a third register bit D5 1404 and a fourth register bit D4 1406 may be used to distinguish between when the extended register write and extended register long write commands are to be used in a normal manner and when the extended register write and extended register long write commands are to be used for a custom masked-write operation.

For example, when the third register bit D5 1404 is set to a value of 1, then the custom masked-write operation is enabled, and the extended register write command or the extended register long write command is to be used for a masked-write operation. However, when the third register bit D5 1404 is set to a value of 0, then the custom masked-write operation is disabled, and both the extended register write command and the extended register long write command are to be used in the normal manner. Moreover, when the fourth register bit D4 1406 is set to a value of 1, then the extended register long write command (e.g., extended register long write command 1302) is to be specifically used for the custom masked write operation if the third register bit D5 1404 is set to the value of 1. When the fourth register bit D4 1406 is set to a value of 0, then the extended register write command (e.g., extended register write command 1202) is to be specifically used for the custom masked-write operation if the third register bit D5 1404 is set to the value of 1.

Figure 15:
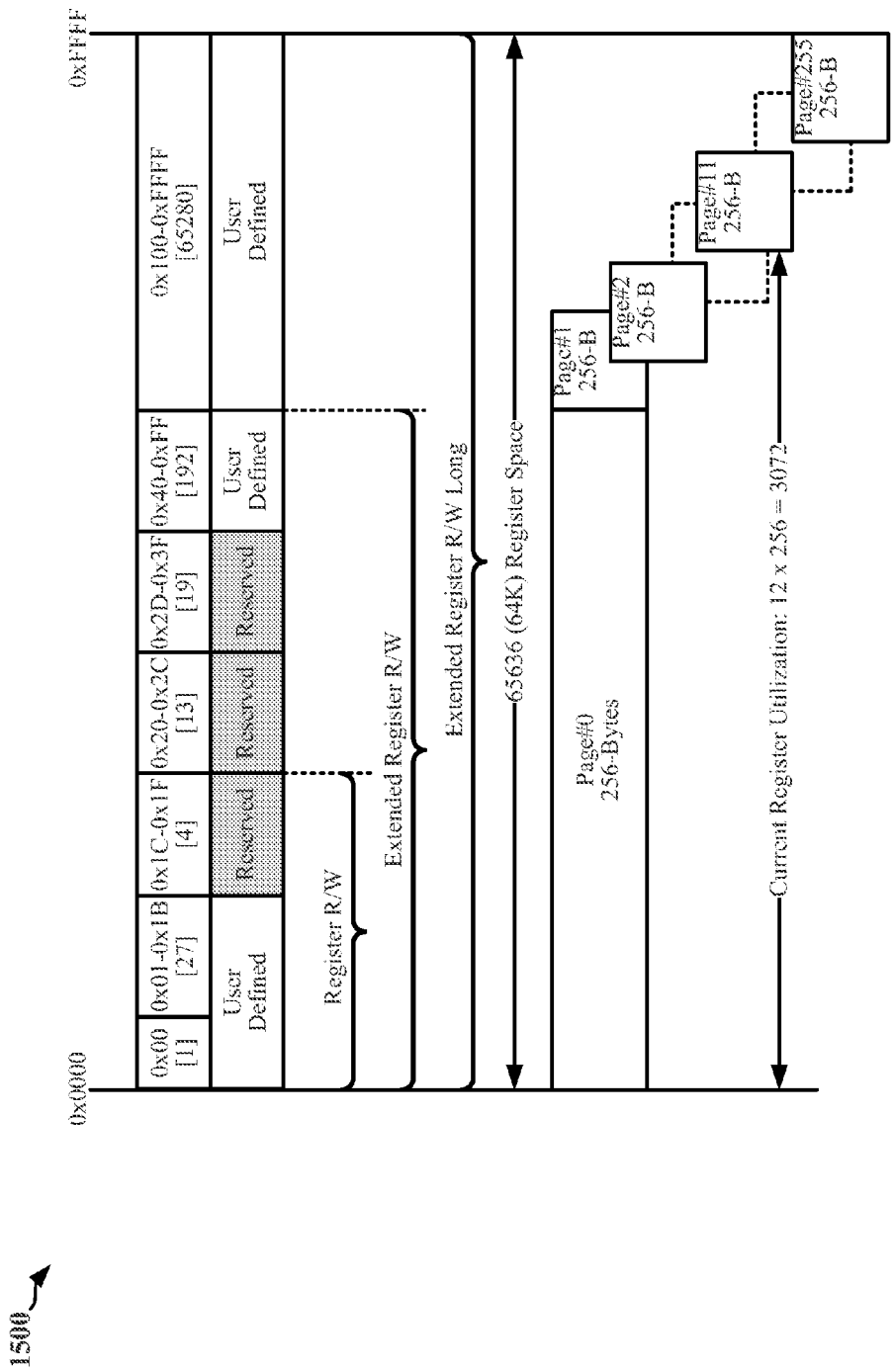
FIG. 15 is a diagram of an RFFE register space.

FIG. 15 is a diagram of an RFFE register space 1500. The RFFE register space 1500 may extend from register 0x0000 to register 0xFFFF in hexadecimal.

An association of commands in terms of register space accessibility is shown in FIG. 15. The reach of an extended register operation may be limited to the space between the 0x00 register and the 0xFF register. However, a complex RFFE slave may contain multiple pages (each having 0x00 to 0xFF 1-byte locations) within the 64K register space, and therefore, enable extended register operation to access the entire 64K register space and reduce bus latency. To achieve this, the 64K register space may be segmented into 256 pages (pages 0x00 to 0xFF), each containing 256 register locations. An 8-bit register address in a datagram combined with a page address allows any register access within the 64K space. The page address may be stored at a known register location and may be combined as an address-MSB with the datagram-supplied 8-bit register address (address-LSB). This may be the basis for page segmented access for an extended register operation.

Figure 16:
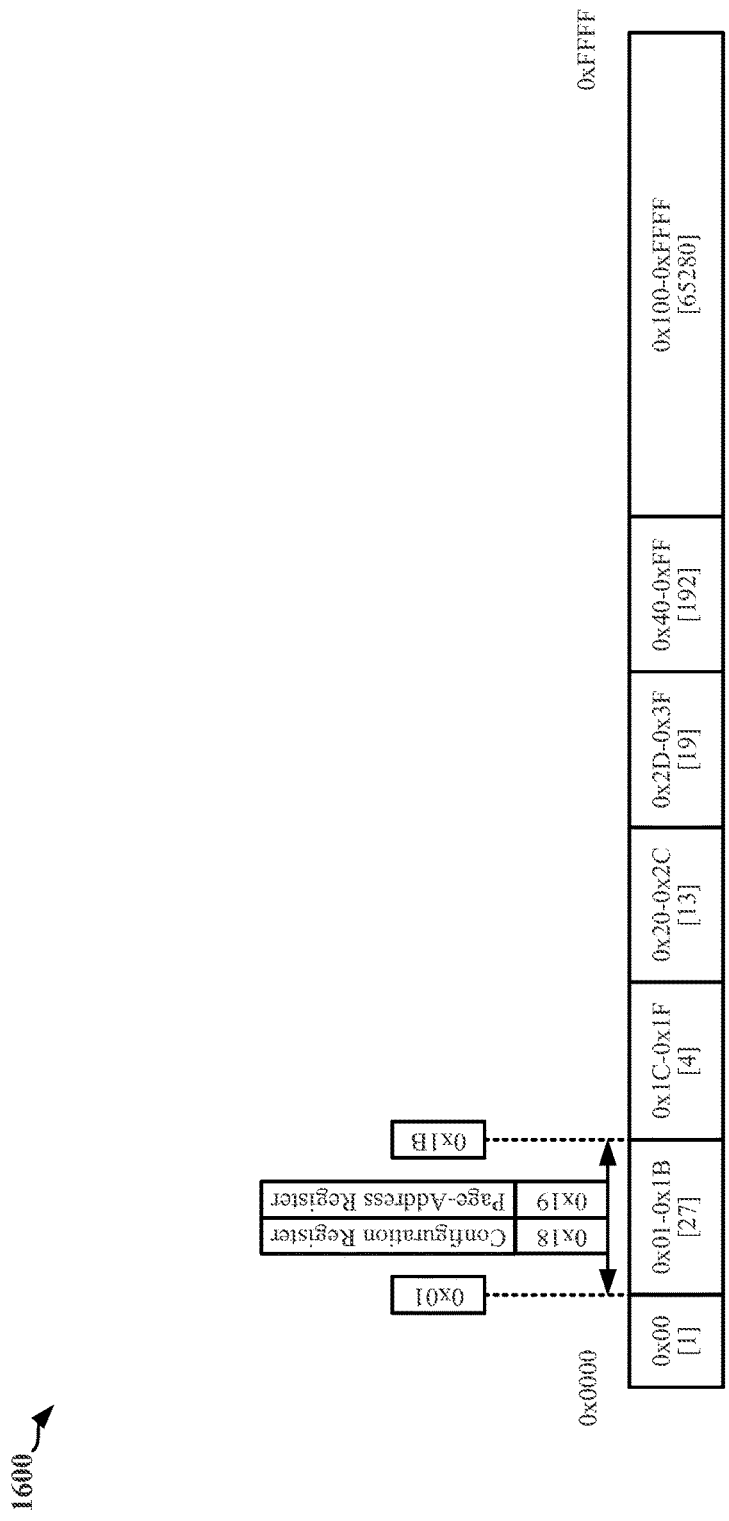
FIG. 16 is a diagram of an RFFE register space having a configuration register and a page-address register.

FIG. 16 is a diagram of an RFFE register space 1600 having a configuration register and a page-address register. To facilitate the enabling and disabling of various features, an 8-bit configuration register may be used. The configuration register and a page-address register may use two specific registers in the register space that are register-mode accessible. For example, as shown in FIG. 16, the configuration register may be defined at location 0x18 and the page-address register may be defined at location 0x19 in the register space. Both the 0x18 and 0x19 locations are in a user defined space.

Figure 17:
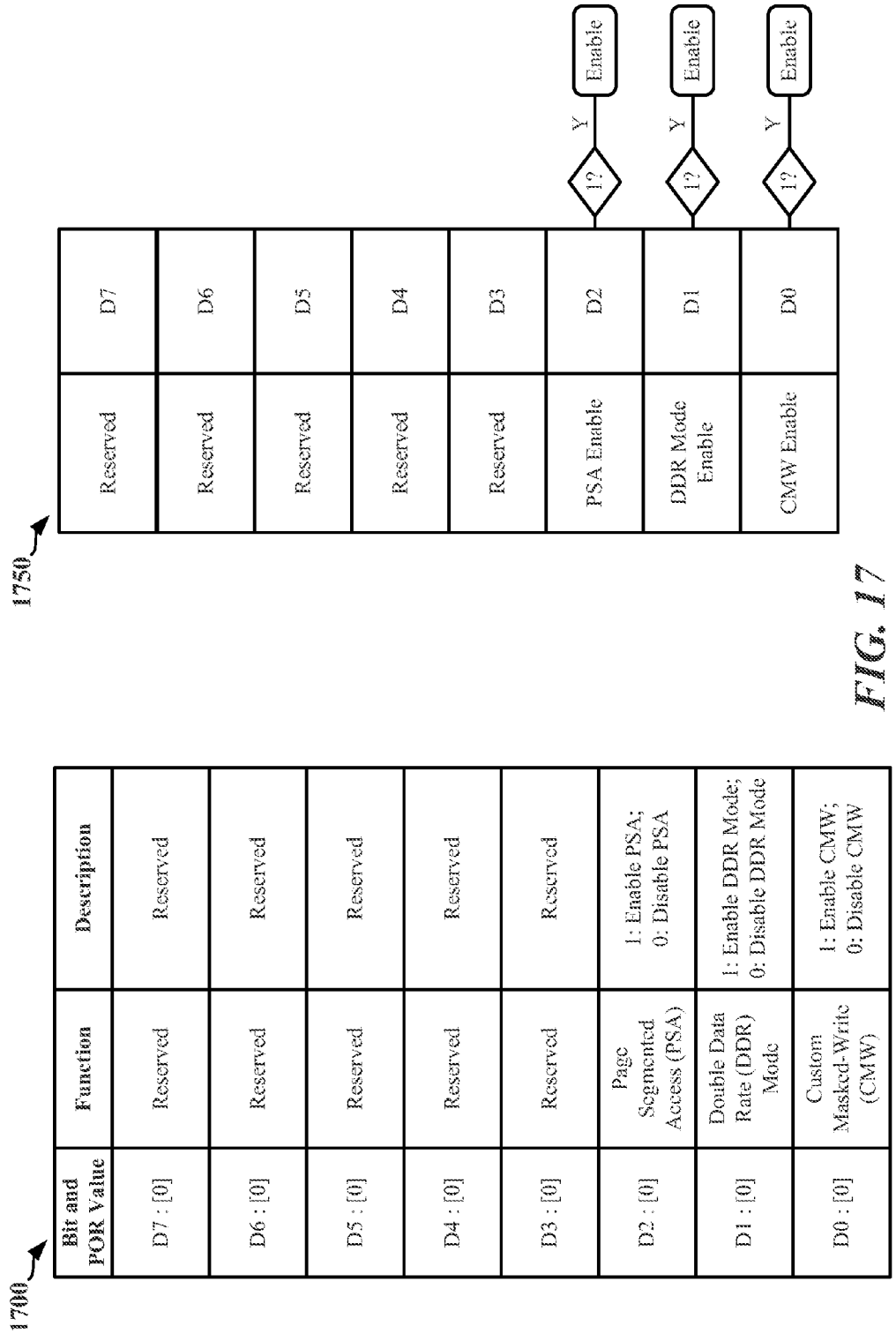
FIG. 17 illustrates a table defining another example bit structure of a configuration register and a diagram depicting a function of the configuration register bits.

FIG. 17 illustrates a table 1700 defining another example bit structure of a configuration register and a diagram 1750 depicting a function of the configuration register bits. A configuration register containing bit locations D7 to D0 may be defined at register location 0x18. Referring to table 1700 and diagram 1750, page segmented access (PSA) may be enabled or disabled by enabling (e.g., setting to "1") or disabling (e.g., setting to "0") the configuration bit at bit location D2. A double data rate (DDR) mode may be enabled or disabled by enabling or disabling the configuration bit at bit location D1. Additionally, custom masked-write (CMW) may be enabled or disabled by enabling or disabling the configuration bit at bit location D0. For D0, D1, and D2, a configuration bit value of "i" implies that a corresponding function is enabled while a configuration bit value of "0" implies that the corresponding function is disabled.

Figure 18:
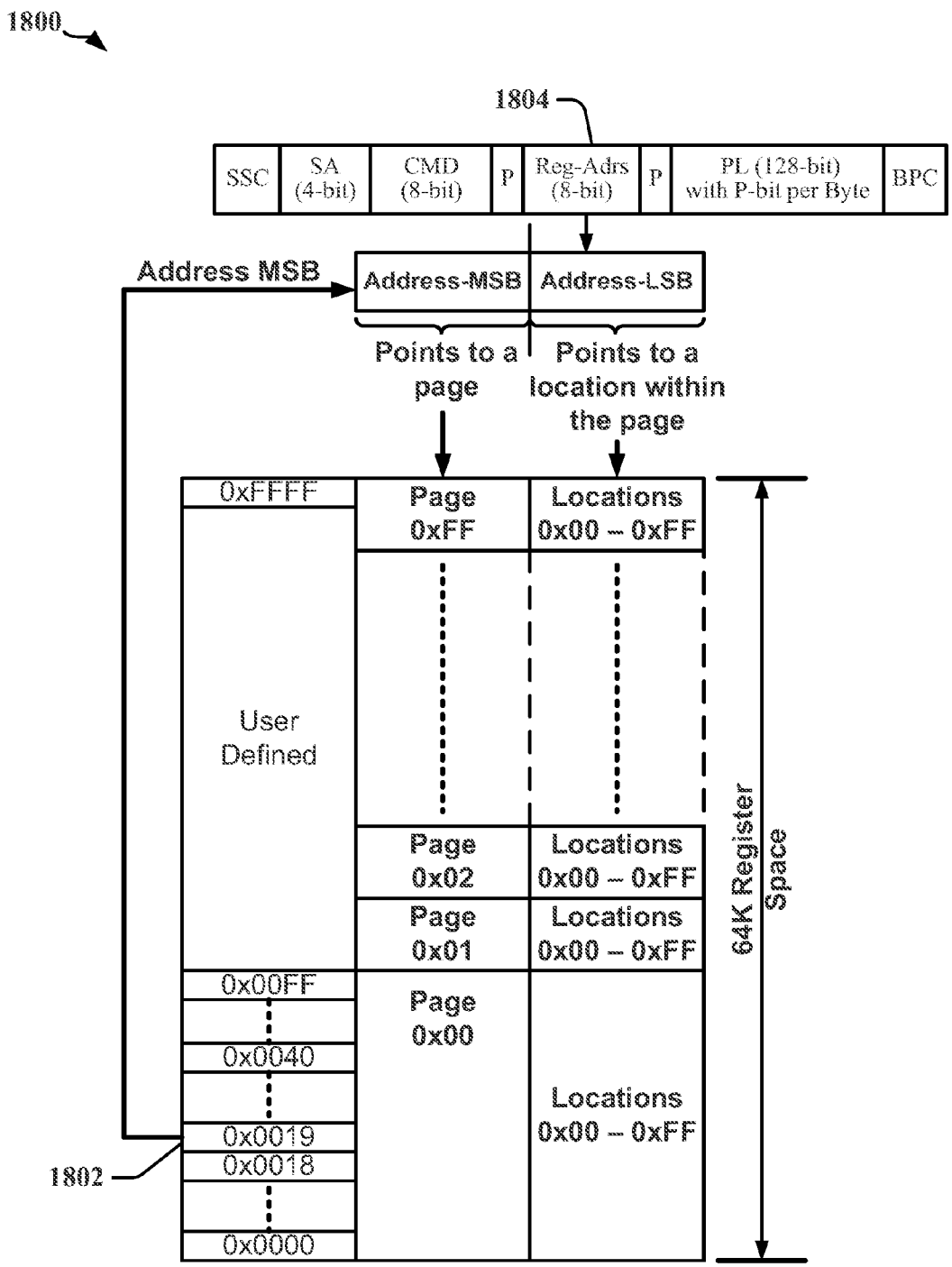
FIG. 18 is a diagram illustrating page segmented access.

FIG. 18 is a diagram 1800 illustrating page segmented access. Standard extended register operations are based on an 8-bit register address. This may limit the applicability of these modes of register access to the first 256 locations of a register space (0x00 to 0xFF). Accordingly, page segmented access (PSA) for an extended register operation may be an alternative to standard extended register long operations in terms of accessing an entire 64K register space while using only an 8-bit register address in the datagram. Because only an 8-bit register address is used, page segmented access also allows for a maximum payload of 16 bytes per datagram, which is more efficient than the conventional extended register long operations using a 16-bit address and having a maximum payload of 8 bytes per datagram.

64K register space access may be enabled for an extended register mode by using a page segmented address register to serve as a register address-MSB location. From a chip level design point of view. PSA operation may be orthogonal to a masked-write operation and a double data rate (DDR) mode operation. Page segmented access (PSA) for the extended register mode may be enabled using a 1-byte register holding the register address-MSB and a single configuration bit included in the configuration register.

PSA for extended register operations may be applicable to both read and write operations. PSA may use a value located at register location 0x19 as the register address-MSB and concatenate the register address-MSB with an 8-bit address (register address-LSB) supplied in the extended register operation datagram. A single bit in the configuration register may enable/disable PSA.

Page segmented access using the content of register location 0x19 and an address-LSB retrieved from an extended register operation datagram is shown in FIG. 18. The page address register 1802 at register location 0x19 may contain an 8-bit MSB value for the register address in the 0x0000 to 0xFFFF register space. The value from the register location 0x19 may be used as an address-MSB and combined with the 8-bit address 1804 (address-LSB) received from the extended register operation datagram. Accordingly, the entire 64K register space may be accessed using only an 8-bit register address 1804 in the extended register operation datagram. The value at register location 0x19 has no effect on the extended register operation if the page segment access (PSA) mode is disabled.

In an aspect of the disclosure, page segmented access (PSA) for extended register operations allows full access to an entire 16-bit address space of any RFFE device. Enabling this feature provides a number of advantages over extended register long-based operations. For example, with only an 8-bit address in the datagram, an entire 64K register space becomes available. Also, since the extended register command can have up to 16 bytes of payload in contrast to the extended register long command, which can only have up to 8 bytes of payload, PSA provides improved throughput and reduces latency.

PSA may be enabled or disabled by enabling (e.g., setting to "1") or disabling (e.g., setting to "0") a single configuration bit (e.g., configuration bit at bit location D2) within a configuration register located at register location 0x18. When enabled, an 8-bit page address stored at register location 0x19 may be serve as a register address-MSB and may be attached to an 8-bit address (serving as an register address-LSB) supplied within an extended register datagram.

Referring back to FIG. 12, the extended register write command 1202 supporting a masked-write operation may be limited to the first 256 locations (register locations 0x00 to 0xFF) of the register space if page segmented access (PSA) is not enabled. However, when PSA is enabled, the extended register write command 1202 supporting the masked-write operation may have full access to the entire 64K register space. As described above, full access to the entire 64K register space is facilitated by using an 8-bit page address stored at register location 0x19 as a register address-MSB, and attaching the register address-MSB to an 8-bit address (used as a register address-LSB) supplied within the extended register write command 1202.

Example of Hardware Implementation

Figure 19:
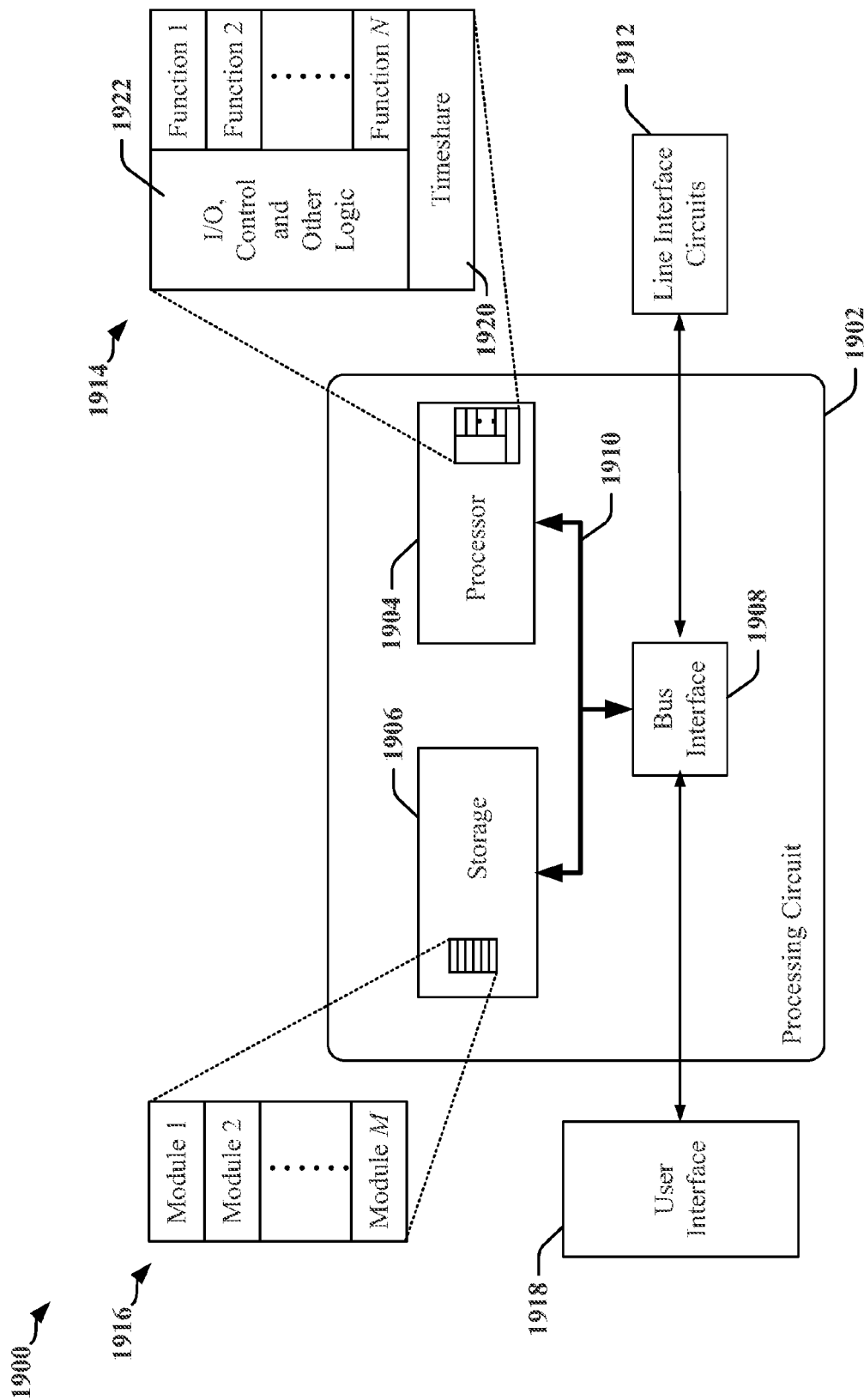
FIG. 19 is a block diagram illustrating an example of an apparatus employing a processing circuit that may be adapted according to certain aspects disclosed herein.

FIG. 19 is a conceptual diagram illustrating a simplified example of a hardware implementation for an apparatus 1900 employing a processing circuit 1902 that may be configured to perform one or more functions disclosed herein. In accordance with various aspects of the disclosure, an element, or any portion of an element, or any combination of elements as disclosed herein may be implemented using the processing circuit 1902. The processing circuit 1902 may include one or more processors 1904 that are controlled by some combination of hardware and software modules. Examples of processors 1904 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more line interface circuits 1912. A line interface circuit 1912 may be provided for each networking technology supported by the processing circuit. In some instances, multiple networking technologies may share some or all of the circuitry or processing modules found in a line interface circuit 1912. Each line interface circuit 1912 provides a means for communicating with various other apparatus over a transmission medium. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as the line interface circuit 1912, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to the line interface circuit 1912, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the line interface circuit 1912, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Figure 20:
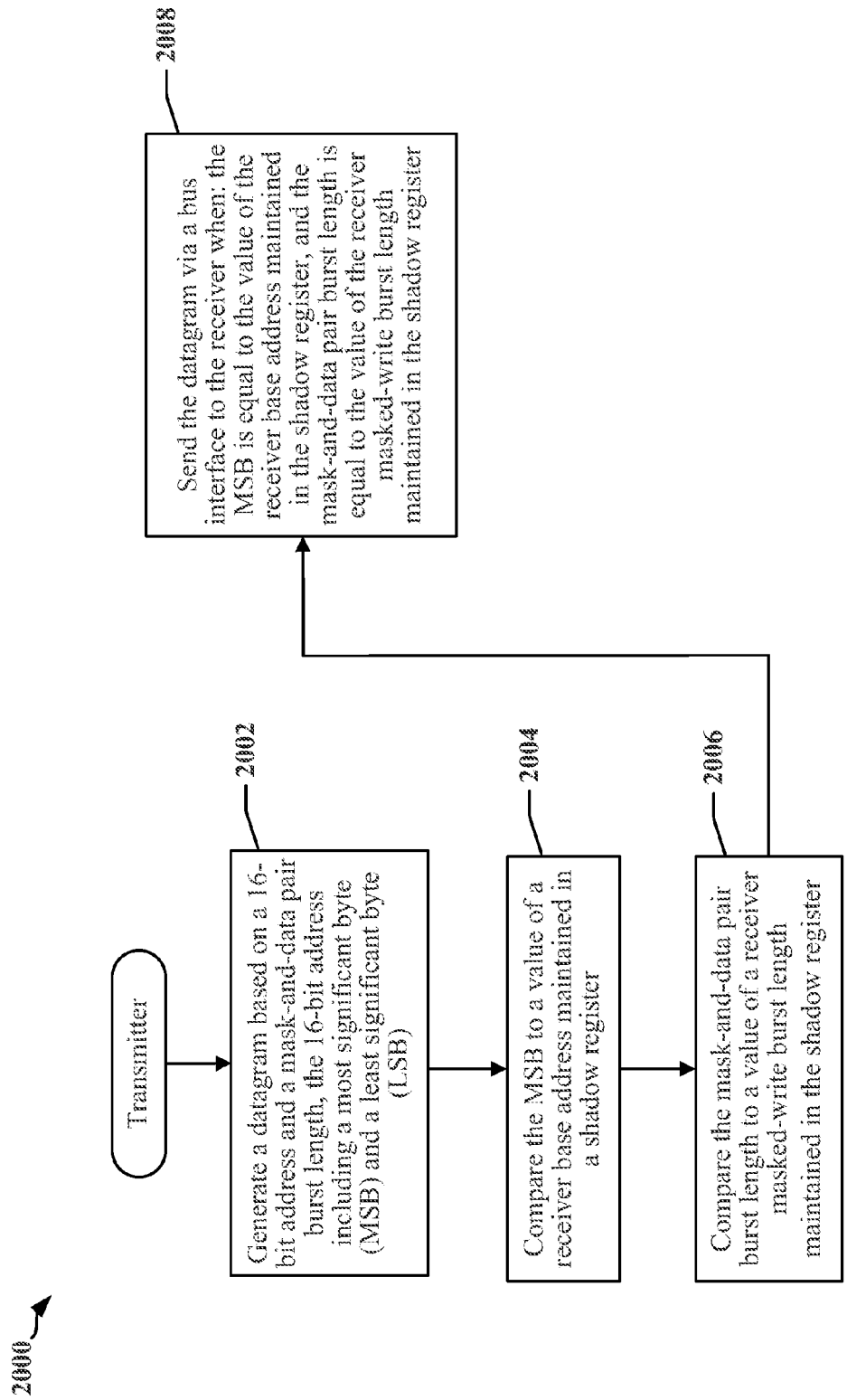
FIG. 20 is a flow chart of a method for sending data to a receiver in accordance with certain aspects disclosed herein.

Exemplary Methods and Device for Sending a Datagram from a Transmitter to a Receiver FIG. 20 is a flow chart 2000 of a method for sending data to a receiver via a bus interface. The method may be performed at a device operating as a transmitter (e.g., bus master).

The device may generate a datagram based on a 16-bit address and a mask-and-data pair burst length 2002. The 16-bit address includes a most significant byte (MSB) and a least significant byte (LSB).

The device then compares the MSB to a receiver base address (segment or value) maintained in a shadow register 2004. This comparison includes detecting whether the MSB is equal to the receiver base address maintained in the shadow register. If the MSB is not equal to the receiver base address maintained in the shadow register, then the device sets a base address at the receiver to be equal to the MSB. The device may set the base address at the receiver by sending a write access command to the receiver prior to sending the datagram. The device further updates the receiver base address maintained in the shadow register to the MSB.

The device may further compare the mask-and-data pair burst length to a receiver masked-write burst length (segment or value) maintained in the shadow register 2006. This comparison includes detecting whether the mask-and-data pair burst length is equal to the receiver masked-write burst length maintained in the shadow register. If the mask-and-data pair burst length is not equal to the receiver masked-write burst length maintained in the shadow register, then the device sets a masked-write burst length at the receiver to be equal to the mask-and-data pair burst length. The device may set the masked-write burst length at the receiver by sending a write access command to the receiver prior to sending the datagram. The device further updates the receiver masked-write burst length maintained in the shadow register to the mask-and-data pair burst length.

Finally, when the MSB is equal to the receiver base address maintained in the shadow register and the mask-and-data pair burst length is equal to the receiver masked-write burst length maintained in the shadow register, the device sends the datagram via the bus interface to the receiver 2008. The datagram sent to the receiver does not include the MSB and the mask-and-data pair burst length.

Figure 21:
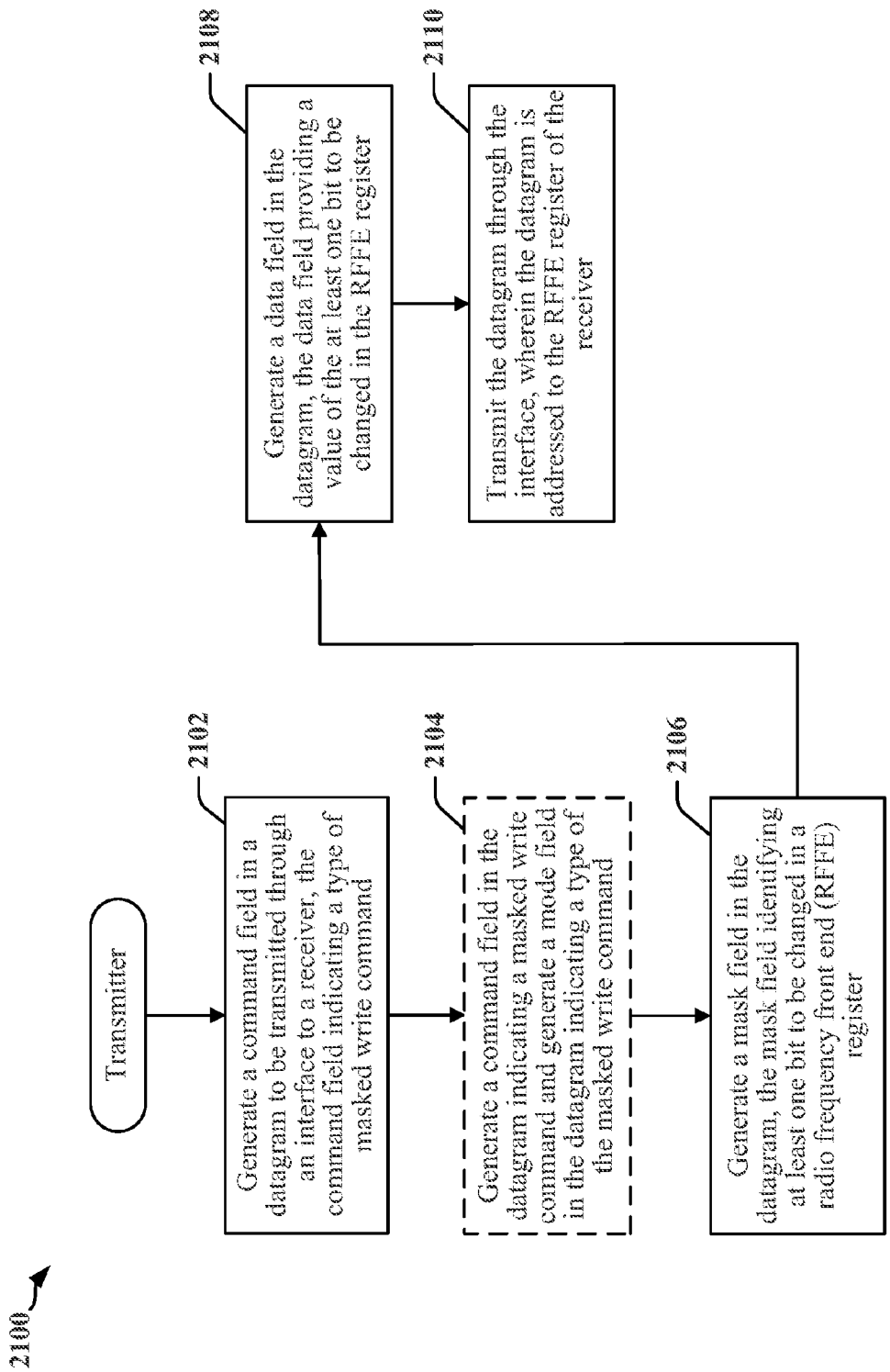
FIG. 21 is a flow chart of another method for sending data to a receiver in accordance with certain aspects disclosed herein.

FIG. 21 is a flow chart 2100 of another method for sending data to a receiver via a bus interface. The method may be performed at a device operating as a transmitter (e.g., bus master).

The device may generate a command field in a datagram to be transmitted through the bus interface to the receiver 2102. The command field may indicate a type of masked write command the datagram is, such as whether the datagram is an extended register masked write command, an extended register long masked write command, a register masked write command, or an extended register short masked write command.

Alternatively, the device may generate a command field and a mode field in the datagram 2104. As such, the command field may indicate that the datagram is a masked write command and the mode field may indicate the masked write command type, such as whether the datagram is an extended register masked write command, an extended register long masked write command, a register masked write command, or an extended register short masked write command.

The device may generate a mask field in the datagram 2106. The mask field identifies at least one bit to be changed in a radio frequency front end (RFFE) register. The mask field also indicates a remaining set of bits to be left unchanged in the RFFE register. The device may also generate a data field in the datagram 2108. The data field provides a value of the at least one bit to be changed in the RFFE register. In an aspect of the disclosure, the mask field is a bit index field identifying a bit position to be changed in the RFFE register, and the data field is a bit value field providing a bit value for the bit position identified in the bit index field.

Finally, the device may transmit the datagram through the interface, wherein the datagram is addressed to the RFFE register of the receiver 2110.

Figure 22:
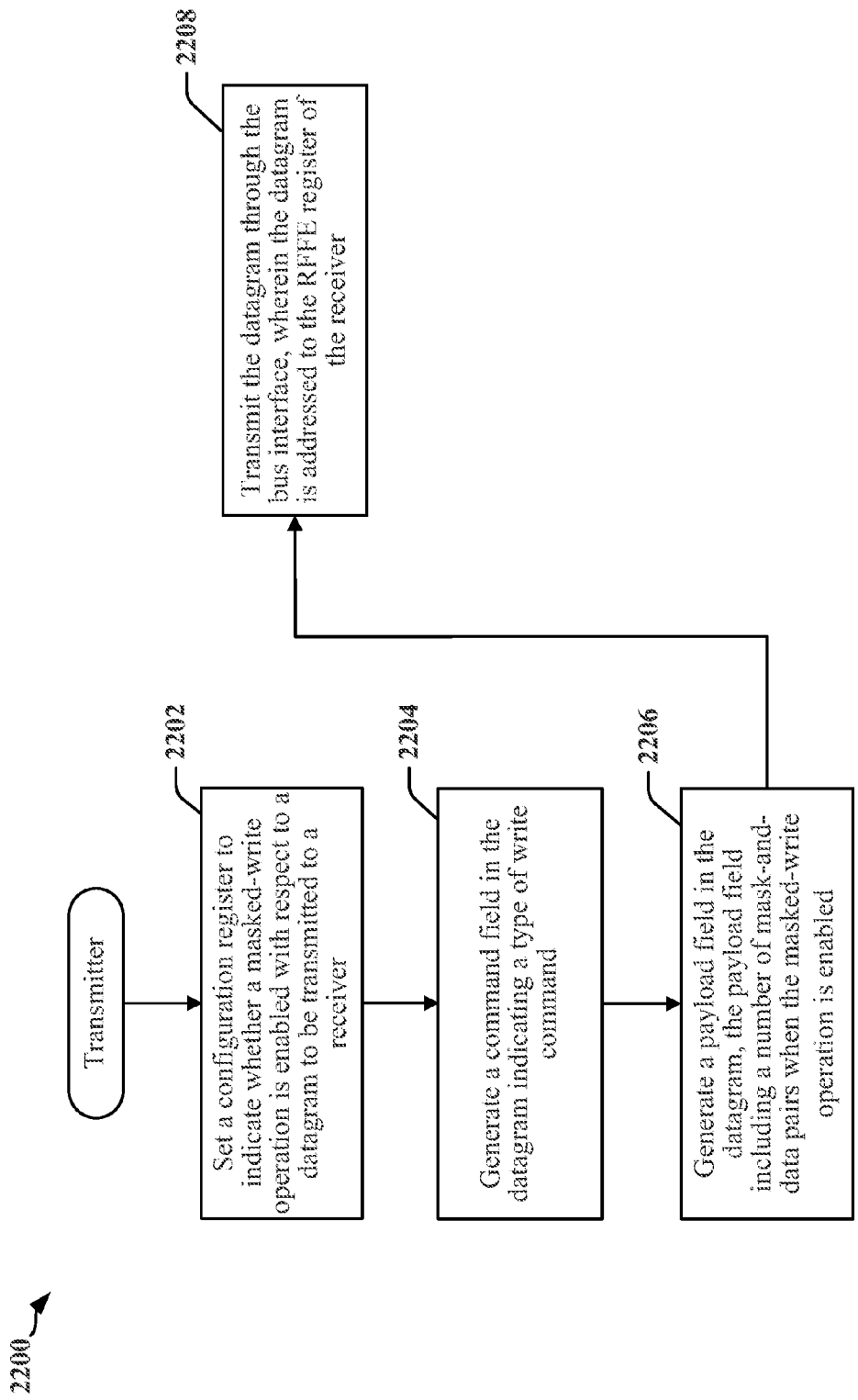
FIG. 22 is a flow chart of a further method for sending data to a receiver in accordance with certain aspects disclosed herein.

FIG. 22 is a flow chart 2200 of a further method for sending data to a receiver via a bus interface. The method may be performed at a device operating as a transmitter (e.g., bus master).

The device may set a configuration register to indicate whether a masked-write operation is enabled with respect to a datagram to be transmitted to the receiver 2202. The configuration register may include eight register bits. Accordingly, the device may set a third register bit (e.g., register bit D5 1404) of the eight register bits to a value of 1 to indicate that the masked-write operation is enabled. Alternatively, the device may set the third register bit (e.g., register bit D5 1404) to a value of 0 to indicate that the masked-write operation is disabled.

In an aspect, the datagram may be either an extended register write command or an extended register long write command. Therefore, when the masked-write operation is enabled, the device may set a fourth register bit (e.g., register bit D4 1406) in the configuration register to a value of 1 to indicate that the masked-write operation is enabled with respect to the extended register long write command. When the masked-write operation is enabled, the device may also set the fourth register bit (e.g., register bit D4 1406) to a value of 0 to indicate that the masked-write operation is enabled with respect to the extended register write command.

The device may generate a command field in the datagram 2204. The command field may indicate whether the datagram is the extended register write command or the extended register long write command.

The device may also generate a payload field in the datagram 2206. The payload field may include a number of mask-and-data pairs when the masked-write operation is enabled. Each mask-and-data pair may include a mask field identifying at least one bit to be changed in a radio frequency front end (RFFE) register and a data field providing a value of the at least one bit to be changed in the RFFE register.

The device transmits the datagram through the bus interface, wherein the datagram is addressed to the RFFE register of the receiver 2208.

Figure 23:
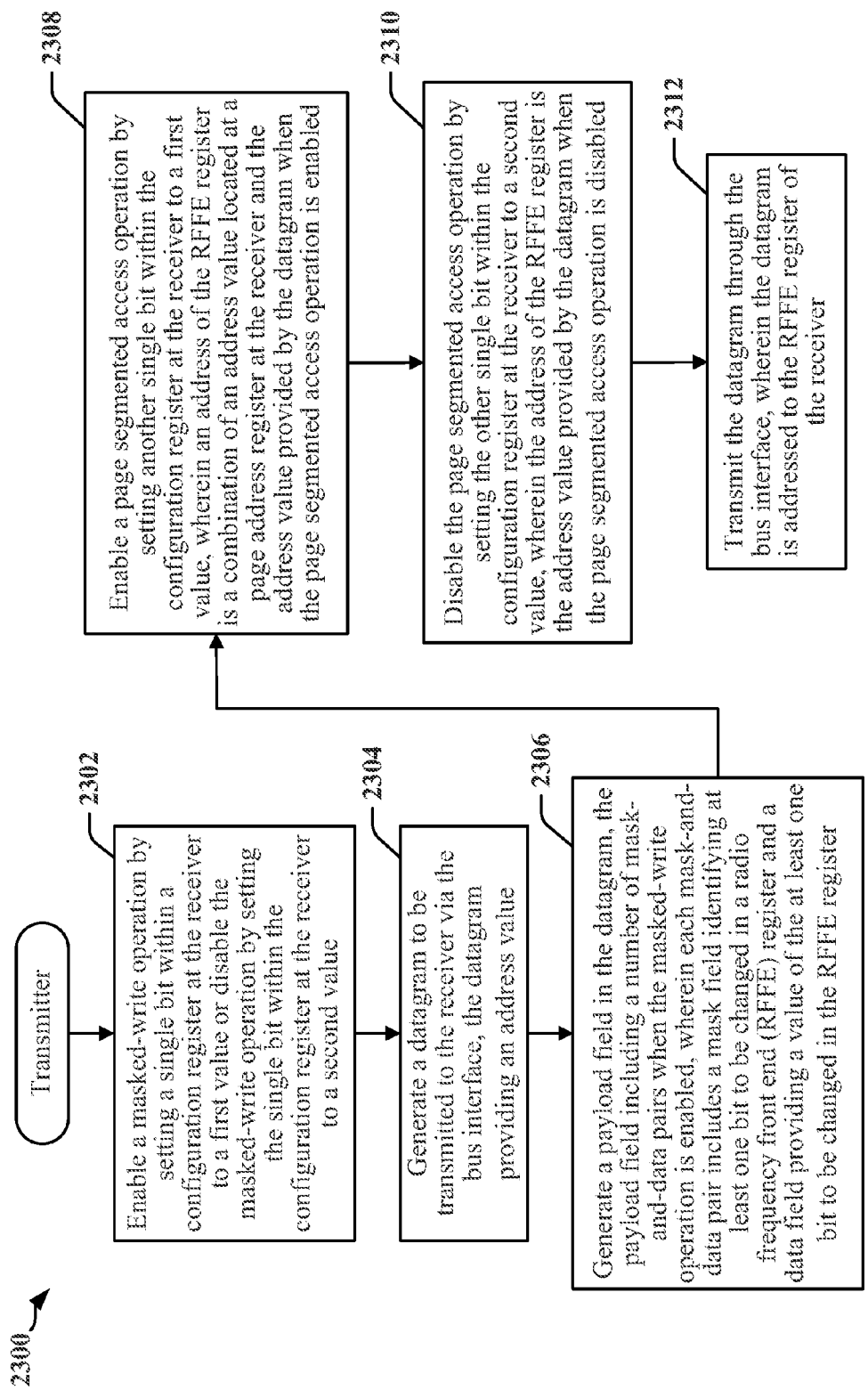
FIG. 23 is a flow chart of another method for sending data to a receiver in accordance with certain aspects disclosed herein.

FIG. 23 is a flow chart 2300 of another method for sending data to a receiver via a bus interface. The method may be performed at a device operating as a transmitter (e.g., bus master).

The device may enable a masked-write operation by setting a single bit within a configuration register at the receiver to a first value 2302. Additionally and/or alternatively, the device may disable the masked-write operation by setting the single bit within the configuration register at the receiver to a second value. For example, the masked-write operation may be enabled by performing a write operation to the receiver's configuration register (e.g., register at location 0x18) in order to set a bit D0 to a value of "1". In another example, the masked-write operation may be disabled by performing a write operation to the receiver's configuration register (e.g., register at location 0x18) in order to set the bit D0 to a value of "0".

The device may generate a datagram to be transmitted to the receiver via the bus interface 2304. The datagram includes or provides an address value (e.g., register address 1804 in FIG. 18). The datagram may be an extended register write datagram or an extended register write long datagram.

The device may also generate a payload field in the datagram 2306. The payload field includes a number of mask-and-data pairs when the masked-write operation is enabled. Each mask-and-data pair includes a mask field identifying at least one bit to be changed in a radio frequency front end (RFFE) register and a data field providing a value of the at least one bit to be changed in the RFFE register.

The device may enable a page segmented access operation by setting another single bit within the configuration register at the receiver to a first value 2308. For example, the page segmented access operation may be enabled by performing a write operation to the receiver's configuration register (e.g., register at location 0x18) in order to set a bit D2 to a value of "1". An address of the RFFE register is a combination of an address value located at a page address register (e.g., register location 0x19) at the receiver and the address value provided by the datagram when the page segmented access operation is enabled.

The device may disable the page segmented access operation by setting the other single bit within the configuration register at the receiver to a second value 2310. For example, the page segmented access operation may be disabled by performing a write operation to the receiver's configuration register (e.g., register at location 0x18) in order to set a bit D2 to a value of "0". The address of the RFFE register is the address value provided by the datagram when the page segmented access operation is disabled.

The device may transmit the datagram through the bus interface, wherein the datagram is addressed to the RFFE register of the receiver 2312.

Figure 24:
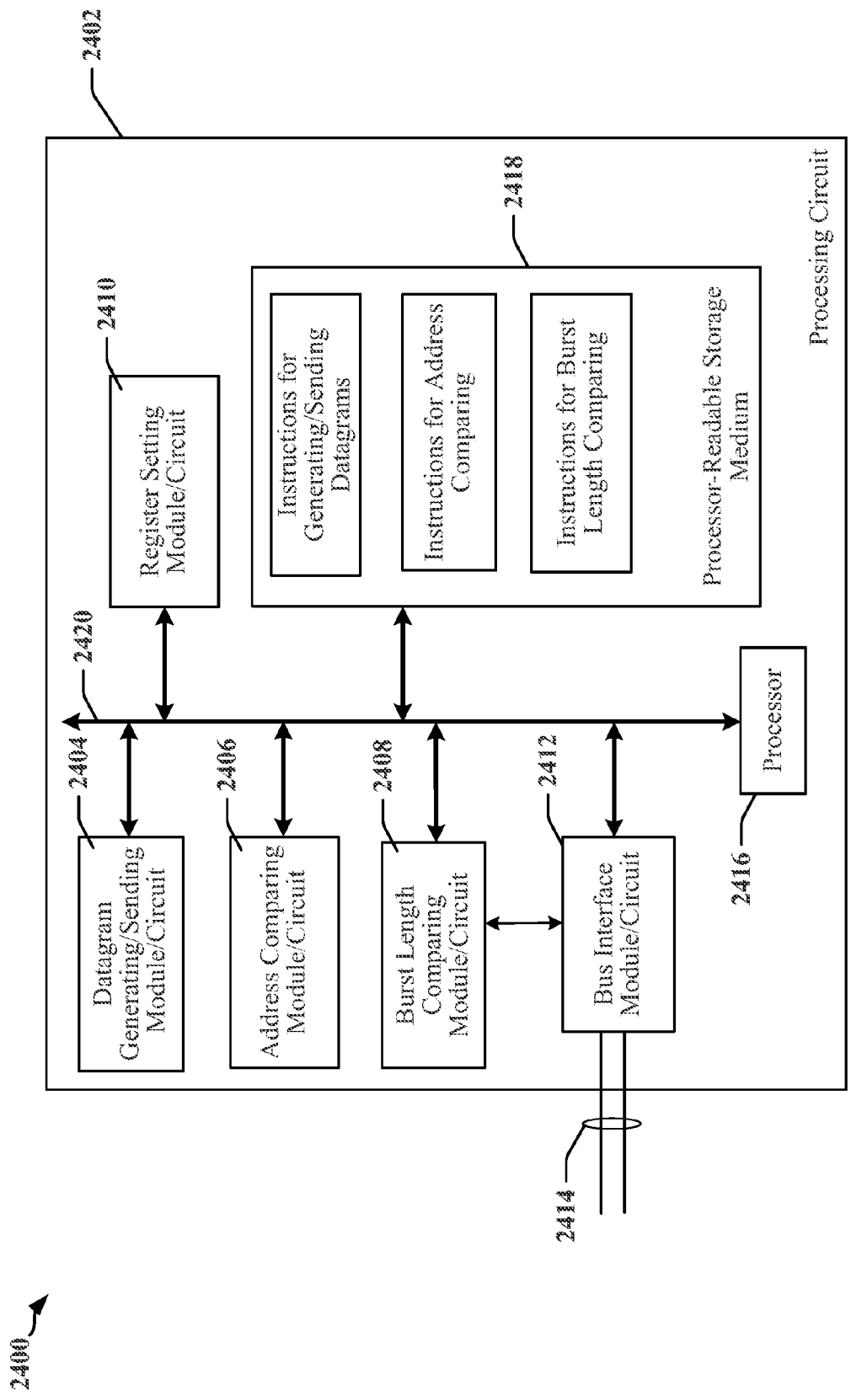
FIG. 24 is a diagram illustrating an example of a hardware implementation for a transmitting apparatus and employing a processing circuit adapted according to certain aspects disclosed herein.

FIG. 24 is a diagram illustrating a simplified example of a hardware implementation for a transmitting apparatus 2400 employing a processing circuit 2402. Examples of operations performed by the transmitting apparatus 2400 include the operations described above with respect to the flow charts of FIGS. 20 to 23. The processing circuit typically has a processor 2416 that may include one or more of a microprocessor, microcontroller, digital signal processor, a sequencer and a state machine. The processing circuit 2402 may be implemented with a bus architecture, represented generally by the bus 2420. The bus 2420 may include any number of interconnecting buses and bridges depending on the specific application of the processing circuit 2402 and the overall design constraints. The bus 2420 links together various circuits including one or more processors and/or hardware modules, represented by the processor 2416, the modules or circuits 2404, 2406, 2408, 2410, bus interface circuits 2412 configurable to support communication over connectors or wires 2414 and the computer-readable storage medium 2418. The bus 2420 may also link various other circuits such as timing sources, peripherals, voltage regulators, and power management circuits, which are well known in the art, and therefore, will not be described any further.

The processor 2416 is responsible for general processing, including the execution of software/instructions stored on the computer-readable storage medium 2418. The software/instructions, when executed by the processor 2416, causes the processing circuit 2402 to perform the various functions described supra for any particular apparatus. The computer-readable storage medium may also be used for storing data that is manipulated by the processor 2416 when executing software, including data decoded from symbols transmitted over the connectors or wires 2414, which may be configured as data lanes and clock lanes. The processing circuit 2402 further includes at least one of the modules/circuits 2404, 2406, 2408, and 2410. The modules/circuits 2404, 2406, 2408, and 2410 may be software modules running in the processor 2416, resident/stored in the computer-readable storage medium 2418, one or more hardware modules coupled to the processor 2416, or some combination thereof. The modules/circuits 2404, 2406, 2408, and/or 2410 may include microcontroller instructions, state machine configuration parameters, or some combination thereof.

In one configuration, the apparatus 2400 for communication includes a datagram generating/sending module/circuit 2404 that is configured to, generate a datagram based on a 16-bit address and a mask-and-data pair burst length, the 16-bit address including a most significant byte (MSB) and a least significant byte (LSB), and via the bus interface module/circuit 2412, send the datagram to a receiver when: the MSB is equal to a receiver base address maintained in a shadow register, and the mask-and-data pair burst length is equal to a receiver masked-write burst length maintained in the shadow register. The apparatus 2400 further includes an address comparing module/circuit 2406 that is configured to, compare the MSB to the receiver base address maintained in the shadow register. The apparatus 2400 further includes a burst length comparing module/circuit 2408 that is configured to, compare the mask-and-data pair burst length to the receiver masked-write burst length maintained in the shadow register. The apparatus 2400 further includes a register setting module/circuit 2410 that is configured to, set a configuration register to indicate whether a masked-write operation is enabled with respect to a datagram to be transmitted through the bus interface module/circuit 2412 to the receiver.

In another configuration, the datagram generating/sending module/circuit 2404 is configured to, generate a command field in a datagram to be transmitted through the bus interface module/circuit 2412 to the receiver, generate a mode field in the datagram, generate a payload field in the datagram, generate a mask field in the datagram, generate a data field in the datagram, and transmit the datagram through the bus interface module/circuit 2412, wherein the datagram is addressed to a radio frequency front end (RFFE) register of the receiver.

In a further configuration, the datagram generating/sending module/circuit 2404 is configured to enable a masked-write operation by setting a single bit within a configuration register at the receiver to a first value, disable the masked-write operation by setting the single bit within the configuration register at the receiver to a second value, generate a datagram to be transmitted to the receiver via the bus interface, the datagram providing an address value, generating a payload field in the datagram, the payload field including a number of mask-and-data pairs when the masked-write operation is enabled, wherein each mask-and-data pair includes a mask field identifying at least one bit to be changed in a radio frequency front end (RFFE) register and a data field providing a value of the at least one bit to be changed in the RFFE register, enable a page segmented access operation by setting another single bit within the configuration register at the receiver to a first value, wherein an address of the RFFE register is a combination of an address value located at a page address register at the receiver and the address value provided by the datagram when the page segmented access operation is enabled, disable the page segmented access operation by setting the other single bit within the configuration register at the receiver to a second value, wherein the address of the RFFE register is the address value provided by the datagram when the page segmented access operation is disabled, and transmit the datagram through the bus interface, wherein the datagram is addressed to the RFFE register of the receiver.

Figure 25:
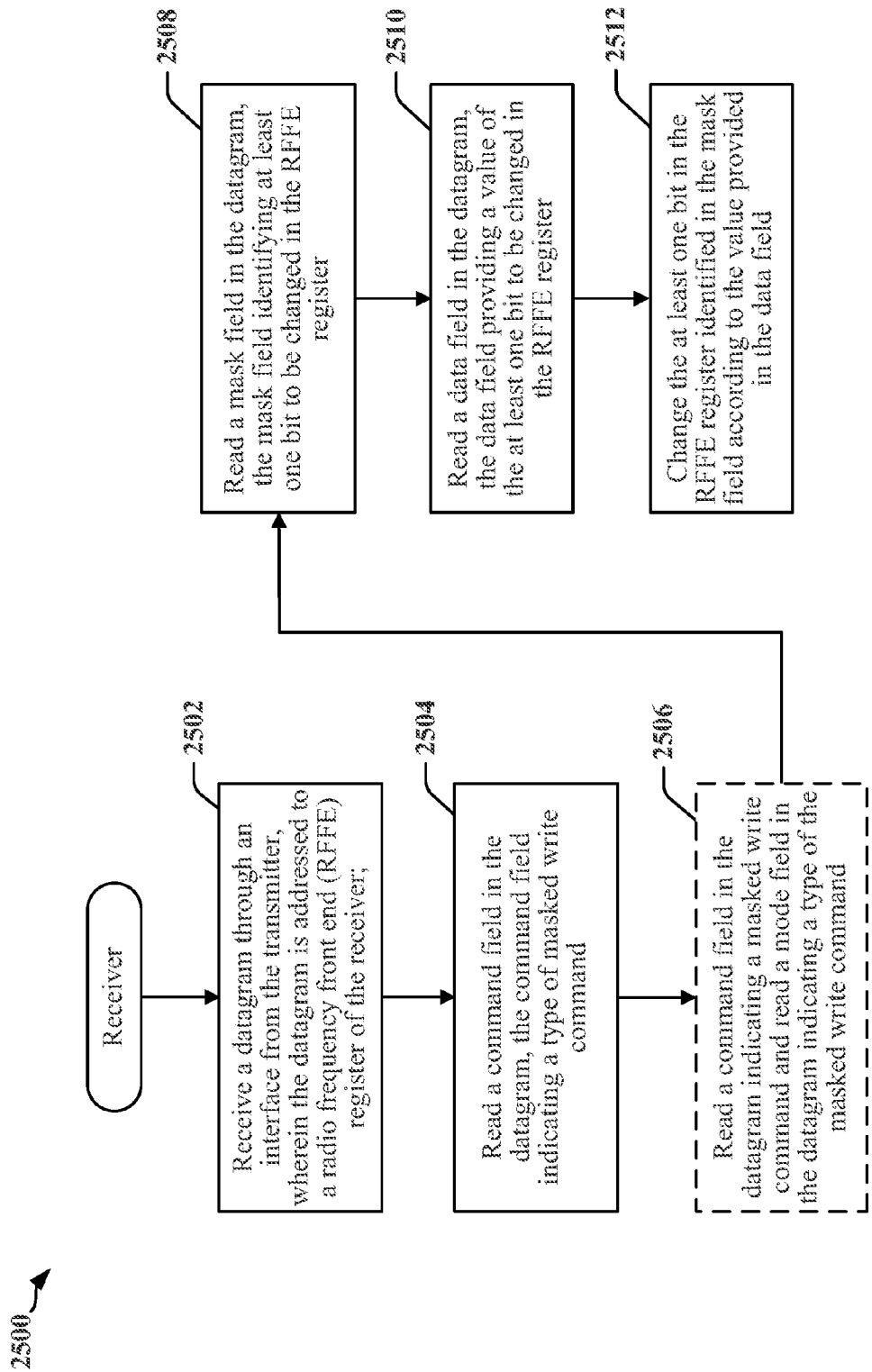
FIG. 25 is a flow chart of a method for receiving data from a transmitter in accordance with certain aspects disclosed herein.

Exemplary Method and Device for Receiving a Datagram at a Receiver from a Transmitter FIG. 25 is a flow chart 2500 of a method for receiving data from a transmitter via a bus interface. The method may be performed at a device operating as a receiver (e.g., bus slave).

The device may receive a datagram through the bus interface from the transmitter 2502. The datagram is addressed to a radio frequency front end (RFFE) register of the receiver.

The device may read a command field in the datagram 2504. The command field may indicate a type of masked write command the datagram is, such as whether the datagram is an extended register masked write command, an extended register long masked write command, a register masked write command, or an extended register short masked write command.

Alternatively, the device may read a command field and a mode field in the datagram 2506. As such, the command field may indicate that the datagram is a masked write command and the mode field may indicate the masked write command type, such as whether the datagram is an extended register masked write command, an extended register long masked write command, a register masked write command, or an extended register short masked write command.

The device may read a mask field in the datagram 2508. The mask field identifies at least one bit to be changed in the RFFE register. The mask field also indicates a remaining set of bits to be left unchanged in the RFFE register. The device may also read a data field in the datagram 2510. The data field provides a value of the at least one bit to be changed in the RFFE register. In an aspect of the disclosure, the mask field is a bit index field identifying a bit position to be changed in the RFFE register, and the data field is a bit value field providing a bit value for the bit position identified in the bit index field.

Finally, the device may change the at least one bit in the RFFE register identified in the mask field according to the value provided in the data field 2512.

Figure 26:
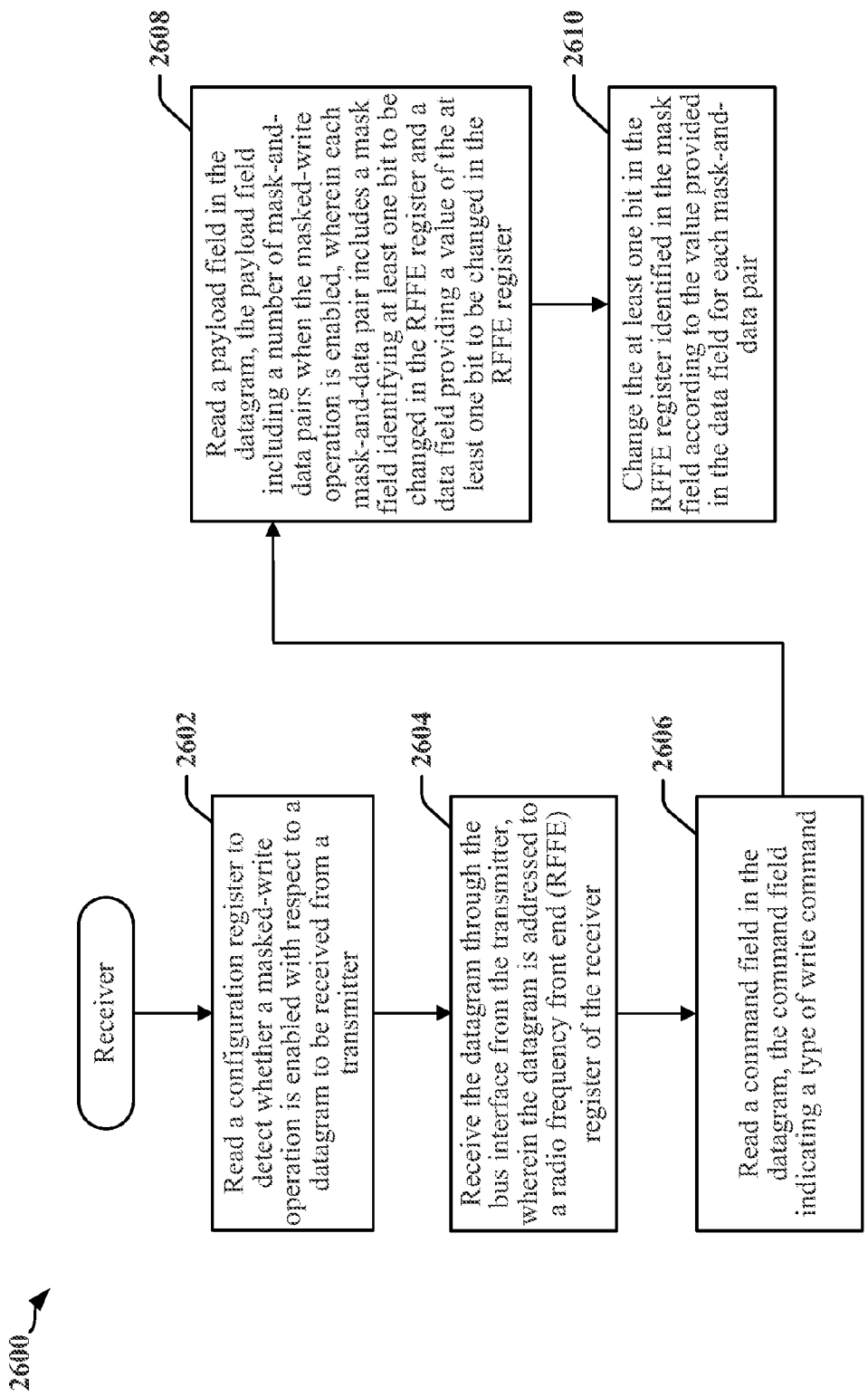
FIG. 26 is a flow chart of another method for receiving data from a transmitter in accordance with certain aspects disclosed herein.

FIG. 26 is a flow chart 2600 of another method for receiving data from a transmitter via a bus interface. The method may be performed at a device operating as a receiver (e.g., bus slave).

The device may read a configuration register to detect whether a masked-write operation is enabled with respect to a datagram to be received from the transmitter 2602. The configuration register includes eight register bits. Accordingly, the device may detect that the masked-write operation is enabled when a third register bit (e.g., register bit D5 1404) of the eight register bits is set to a value of 1. The device may also detect that the masked-write operation is disabled when the third register bit (e.g., register bit D5 1404) is set to a value of 0.

In an aspect, the datagram may be either an extended register write command or an extended register long write command. Therefore, when the masked-write operation is enabled, the device may detect that the masked-write operation is enabled with respect to the extended register long write command when a fourth register bit (e.g., register bit D4 1406) in the configuration register is set to a value of 1. When the masked-write operation is enabled, the device may also detect that the masked-write operation is enabled with respect to the extended register write command when the fourth register bit (e.g., register bit D4 1406) is set to a value of 0.

The device may receive the datagram through the bus interface from the transmitter 2604, wherein the datagram is addressed to a radio frequency front end (RFFE) register of the receiver.

The device may read a command field in the datagram 2606. The command field indicates whether the datagram is the extended register write command or the extended register long write command.

The device may also read a payload field in the datagram 2608. The payload field includes a number of mask-and-data pairs when the masked-write operation is enabled. Each mask-and-data pair includes a mask field identifying at least one bit to be changed in the RFFE register and a data field providing a value of the at least one bit to be changed in the RFFE register. Finally, the device may change the at least one bit in the RFFE register identified in the mask field according to the value provided in the data field for each mask-and-data pair 2610.

Figure 27:
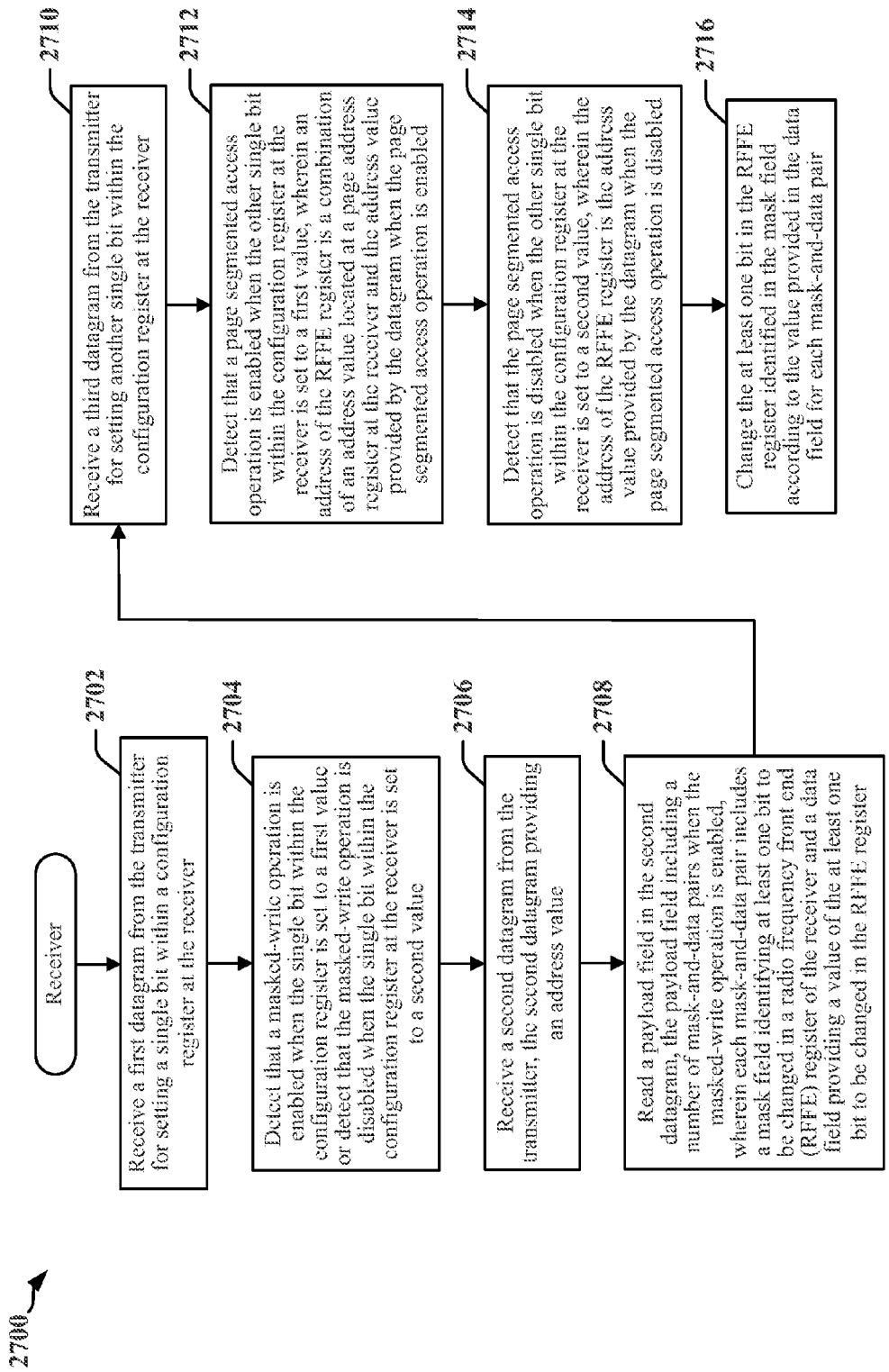
FIG. 27 is a flow chart of a further method for receiving data from a transmitter in accordance with certain aspects disclosed herein.

FIG. 27 is a flow chart 2700 of a further method for receiving data from a transmitter via a bus interface. The method may be performed at a device operating as a receiver (e.g., bus slave).

The device may receive a first datagram from the transmitter for setting a single bit within a configuration register at the receiver 2702. The device may detect that a masked-write operation is enabled when the single bit within the configuration register is set to a first value. Alternatively, the device may detect that the masked-write operation is disabled when the single bit within the configuration register at the receiver is set to a second value 2704. For example, the device may detect that the masked-write operation is enabled when a bit D0 in the receiver's configuration register (e.g., register at location 0x18) has a value of "1" as set by the transmitter via a write operation. In another example, the device may detect that the masked-write operation is disabled when the bit D0 in the receiver's configuration register (e.g., register at location 0x18) has a value of "0" as set by the transmitter via a write operation.

The device may receive a second datagram from the transmitter 2706. The second datagram includes or provides an address value (e.g., register address 1804 in FIG. 18). The second datagram may be an extended register write datagram or an extended register write long datagram.

The device may reading a payload field in the second datagram 2708. The payload field includes a number of mask-and-data pairs when the masked-write operation is enabled. Each mask-and-data pair includes a mask field identifying at least one bit to be changed in a radio frequency front end (RFFE) register of the receiver and a data field providing a value of the at least one bit to be changed in the RFFE register.

The device may receive a third datagram from the transmitter for setting another single bit within the configuration register at the receiver 2710. The device may detect that a page segmented access operation is enabled when the other single bit within the configuration register at the receiver is set to a first value 2712. For example, the device may detect that the page segmented access operation is enabled when a bit D2 in the receiver's configuration register (e.g., register at location 0x18) has a value of "I" as set by the transmitter via a write operation. An address of the RFFE register is a combination of an address value located at a page address register (e.g., register location 0x19) at the receiver and the address value provided by the datagram when the page segmented access operation is enabled.

The device may detect that the page segmented access operation is disabled when the other single bit within the configuration register at the receiver is set to a second value 2714. For example, the device may detect that the page segmented access operation is disabled when the bit D2 in the receiver's configuration register (e.g., register at location 0x18) has a value of "0" as set by the transmitter via a write operation. The address of the RFFE register is the address value provided by the datagram when the page segmented access operation is disabled.

The device may change the at least one bit in the RFFE register identified in the mask field according to the value provided in the data field for each mask-and-data pair 2716.

Figure 28:
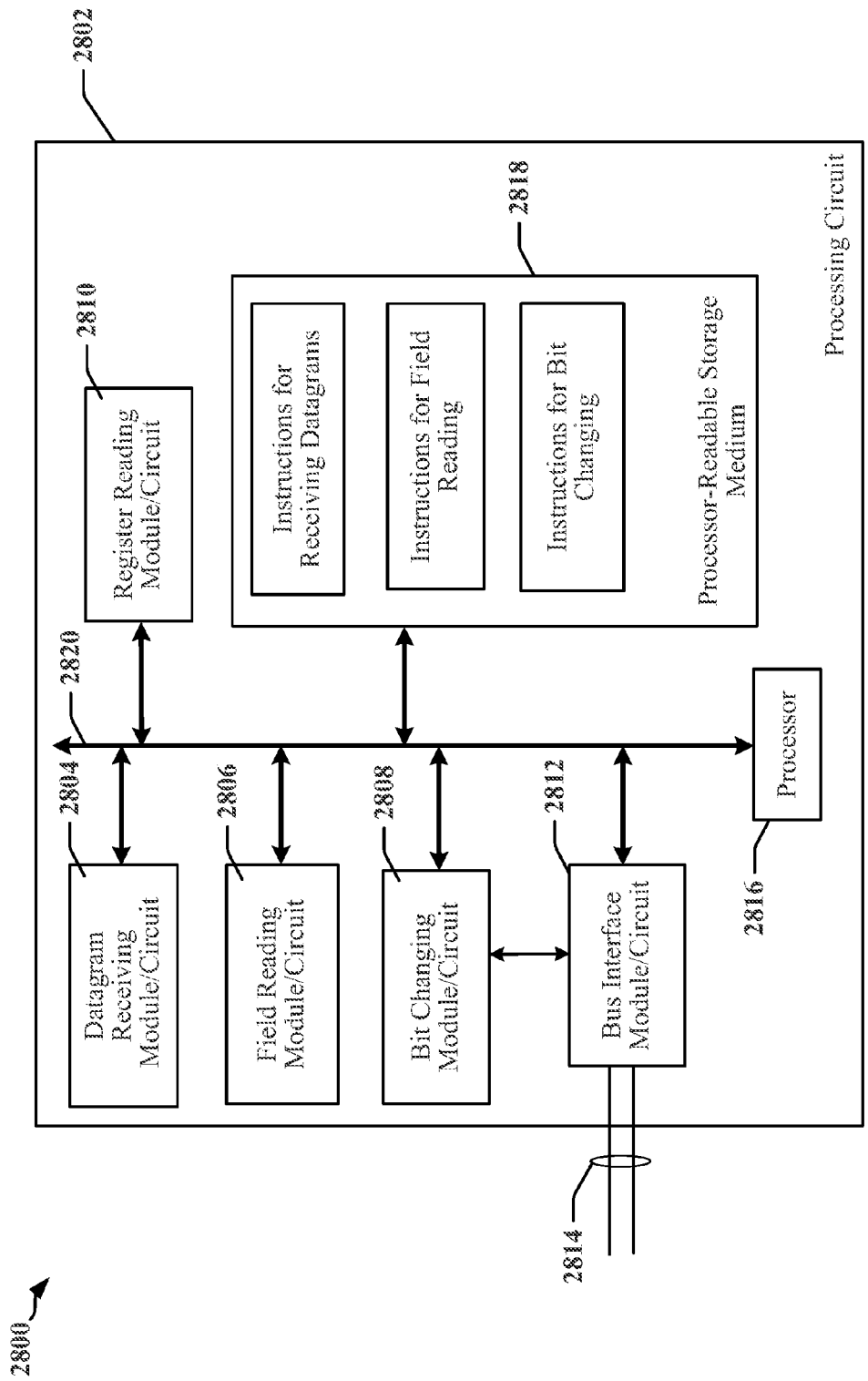
FIG. 28 is a diagram illustrating an example of a hardware implementation for a receiving apparatus and employing a processing circuit adapted according to certain aspects disclosed herein.

FIG. 28 is a diagram illustrating a simplified example of a hardware implementation for a receiving apparatus 2800 employing a processing circuit 2802. Examples of operations performed by the receiving apparatus 2800 include the operations described above with respect to the flow chart of FIGS. 25 to 27. The processing circuit typically has a processor 2816 that may include one or more of a microprocessor, microcontroller, digital signal processor, a sequencer and a state machine. The processing circuit 2802 may be implemented with a bus architecture, represented generally by the bus 2820. The bus 2820 may include any number of interconnecting buses and bridges depending on the specific application of the processing circuit 2802 and the overall design constraints. The bus 2820 links together various circuits including one or more processors and/or hardware modules, represented by the processor 2816, the modules or circuits 2804, 2806, 2808, 2810, bus interface circuits 2812 configurable to support communication over connectors or wires 2814 and the computer-readable storage medium 2818. The bus 2820 may also link various other circuits such as timing sources, peripherals, voltage regulators, and power management circuits, which are well known in the art, and therefore, will not be described any further.

The processor 2816 is responsible for general processing, including the execution of software/instructions stored on the computer-readable storage medium 2818. The software/instructions, when executed by the processor 2816, causes the processing circuit 2802 to perform the various functions described supra for any particular apparatus. The computer-readable storage medium may also be used for storing data that is manipulated by the processor 2816 when executing software, including data decoded from symbols transmitted over the connectors or wires 2814, which may be configured as data lanes and clock lanes. The processing circuit 2802 further includes at least one of the modules/circuits 2804, 2806, 2808, and 2810. The modules/circuits 2804, 2806, 2808, and 2810 may be software modules running in the processor 2816, resident/stored in the computer-readable storage medium 2818, one or more hardware modules coupled to the processor 2816, or some combination thereof. The modules/circuits 2804, 2806, 2808, and/or 2810 may include microcontroller instructions, state machine configuration parameters, or some combination thereof.

In one configuration, the apparatus 2800 for communication includes a datagram receiving module/circuit 2804 that is configured to, receive a datagram through the bus interface module/circuit 2812 from a transmitter, wherein the datagram is addressed to a radio frequency front end (RFFE) register of the apparatus 2800. The apparatus 2800 further includes a field reading module/circuit 2806 that is configured to, read a command field in the datagram, read a payload field in the datagram, read a mode field in the datagram, read a mask field in the datagram, and read a data field in the datagram. The apparatus 2800 further includes a bit changing module/circuit 2808 that is configured to, change at least one bit in the RFFE register identified in the mask field according to a value provided in the data field. The apparatus 2800 also includes a register reading module/circuit 2810 that is configured to, read a configuration register to detect whether a masked-write operation is enabled with respect to a datagram to be received from the transmitter.

In another configuration, the datagram receiving module/circuit 2804 is configured to receive a first datagram from the transmitter for setting a single bit within a configuration register at the receiver, detect that a masked-write operation is enabled when the single bit within the configuration register is set to a first value, detect that the masked-write operation is disabled when the single bit within the configuration register at the receiver is set to a second value, receive a second datagram from the transmitter, the second datagram providing an address value, receive a third datagram from the transmitter for setting another single bit within the configuration register at the receiver, detect that a page segmented access operation is enabled when the other single bit within the configuration register at the receiver is set to a first value, wherein an address of the RFFE register is a combination of an address value located at a page address register at the receiver and the address value provided by the datagram when the page segmented access operation is enabled, and detect that the page segmented access operation is disabled when the other single bit within the configuration register at the receiver is set to a second value, wherein the address of the RFFE register is the address value provided by the datagram when the page segmented access operation is disabled, In another configuration, the field reading module/circuit 2806 is configured to read a payload field in the second datagram, the payload field including a number of mask-and-data pairs when the masked-write operation is enabled, wherein each mask-and-data pair includes a mask field identifying at least one bit to be changed in a radio frequency front end (RFFE) register of the receiver and a data field providing a value of the at least one bit to be changed in the RFFE register.

In another configuration, the field reading module/circuit 2806 is configured to change the at least one bit in the RFFE register identified in the mask field according to the value provided in the data field for each mask-and-data pair.

Figure 29:
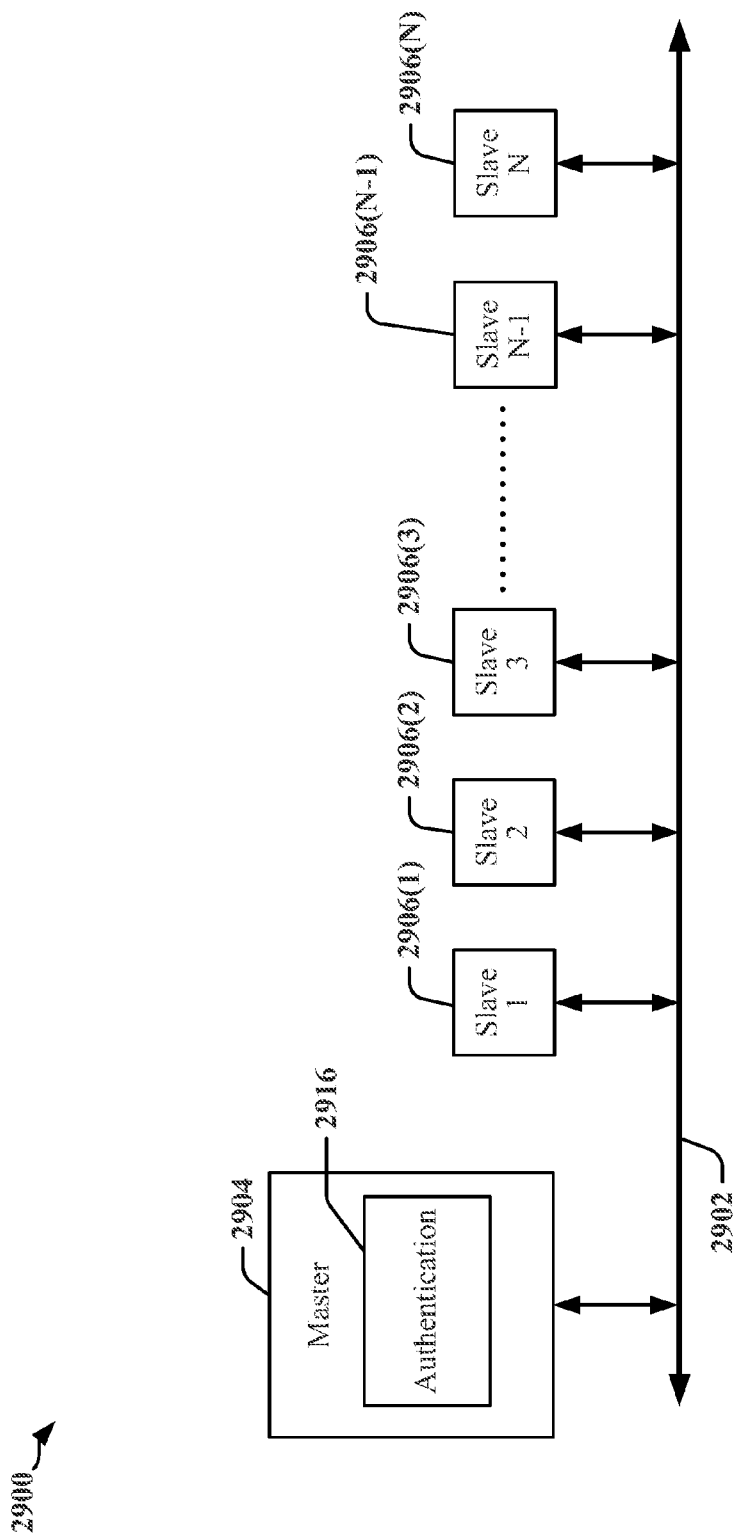
FIG. 29 is a block schematic diagram illustrating an example of an architecture for a device that may employ an RFFE bus to connect a bus master device and slave devices.

Another Exemplary Masked Write Operating Environment for Radio Frequency Front End (RFFE) Devices FIG. 29 is a block schematic diagram illustrating an example of an architecture for a device 2900 that may employ an RFFE bus 2902 to connect a bus master device 2904 and slave devices 2906(1) to 2906(N). The RFFE bus 2902 may be configured according to application needs, and access to multiple buses 2902 may be provided to certain of the devices 2904 and 2906(1) to 2906(N). In an aspect, the bus master device 2904 and the slave devices 2906(1) to 2906(N) may be configured to operate in the same manner as the bus master devices and the slave devices described above (e.g., with respect to FIGS. 2 and 3).

In a further aspect, any one of the slave devices 2906(1) to 2906(N) (e.g., source slave device) may generate a masked-write datagram targeted to another slave device on the RFFE bus 2902. The masked-write datagram may include a mask field identifying at least one bit to be changed in an RFFE register of the targeted slave device and a data field providing a value of the at least one bit to be changed in the RFFE register. Prior to the source slave device sending the masked-write datagram to the targeted slave device, the source slave device may request permission from the bus master device 2904 to perform the slave-to-slave communication. Thereafter, the source slave device may send the masked-write datagram to the targeted slave device if permitted by the bus master device 2904.

In an aspect, the bus master device 2904 may be configured to perform a security function with respect to slave-to-slave communications on the RFFE bus 2902. For example, the bus master device 2904 may include an authentication circuit/module 2916 that is configured to determine whether a slave-to-slave communication is allowed, e.g., based on a table lookup of allowed interactions.

In general, when one of the slave devices 2906(1) to 2906(N) indicates a request to send a masked-write datagram to another slave device on the RFFE bus 2902, the bus master device 2904 may consider the request (via the authentication circuit/module 2916) and compare the intended slave-to-slave communication against a system definition of allowed interactions. Such comparison may include communication with a security entity. If the bus master device 2904 approves of the requested slave-to-slave communication, the bus master device 2904 may either take no specific action or may acknowledge approval to the requesting slave device. If the bus master device 2904 disapproves of the requested slave-to-slave communication, the bus master device 2904 may block the sending of the masked-write datagram on the RFFE bus 2902, notify the requesting slave device that the request is not approved, and/or take some other action.

Figure 30:
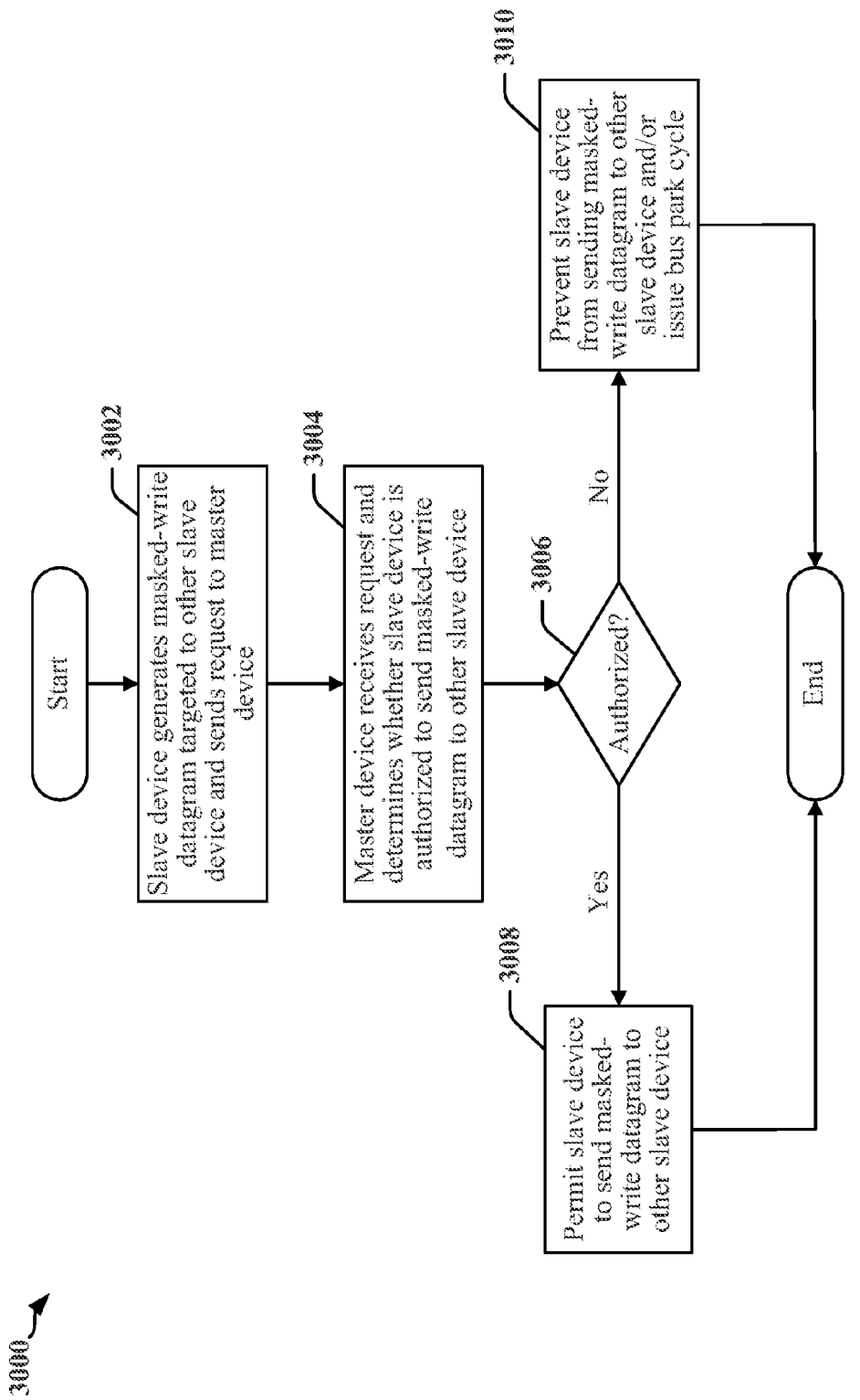
FIG. 30 is a flow chart of a method for communicating masked-write datagrams between slave devices via a RFFE bus.

FIG. 30 is a flow chart 3000 of a method for communicating masked-write datagrams between slave devices via a RFFE bus.

At 3002, a slave device may generate a masked-write datagram targeted to another slave device on the RFFE bus. The slave device may further indicate a request to a bus master device to send the masked-write datagram to the other slave device.

At 3004, the bus master device may receive the request and decide whether the slave device is authorized to send the masked-write datagram to the other slave device. For example, the bus master device may compare the requested slave-to-slave communication against a system definition of allowed interactions.

At 3006, if the bus master device authorizes the slave-to-slave communication, the bus master device (at 3008) permits the slave device to send the masked-write datagram to the other slave device. For example, the bus master device may permit the sending of the masked-write datagram by either taking no specific action or indicating approval of the slave-to-slave communication to the requesting slave device.

Alternatively, at 3006, if the bus master device does not authorize the slave-to-slave communication, the bus master device (at 3010) may prevent the slave device from sending the masked-write datagram to the other slave device. For example, the bus master device may prevent the sending of the masked-write datagram by indicating disapproval of the slave-to-slave communication to the requesting slave device and/or issuing a bus park cycle on the RFFE bus to block the communication of the masked-write datagram.

Exemplary Method and Device for Facilitating Data Communication on a Bus

Figure 31:
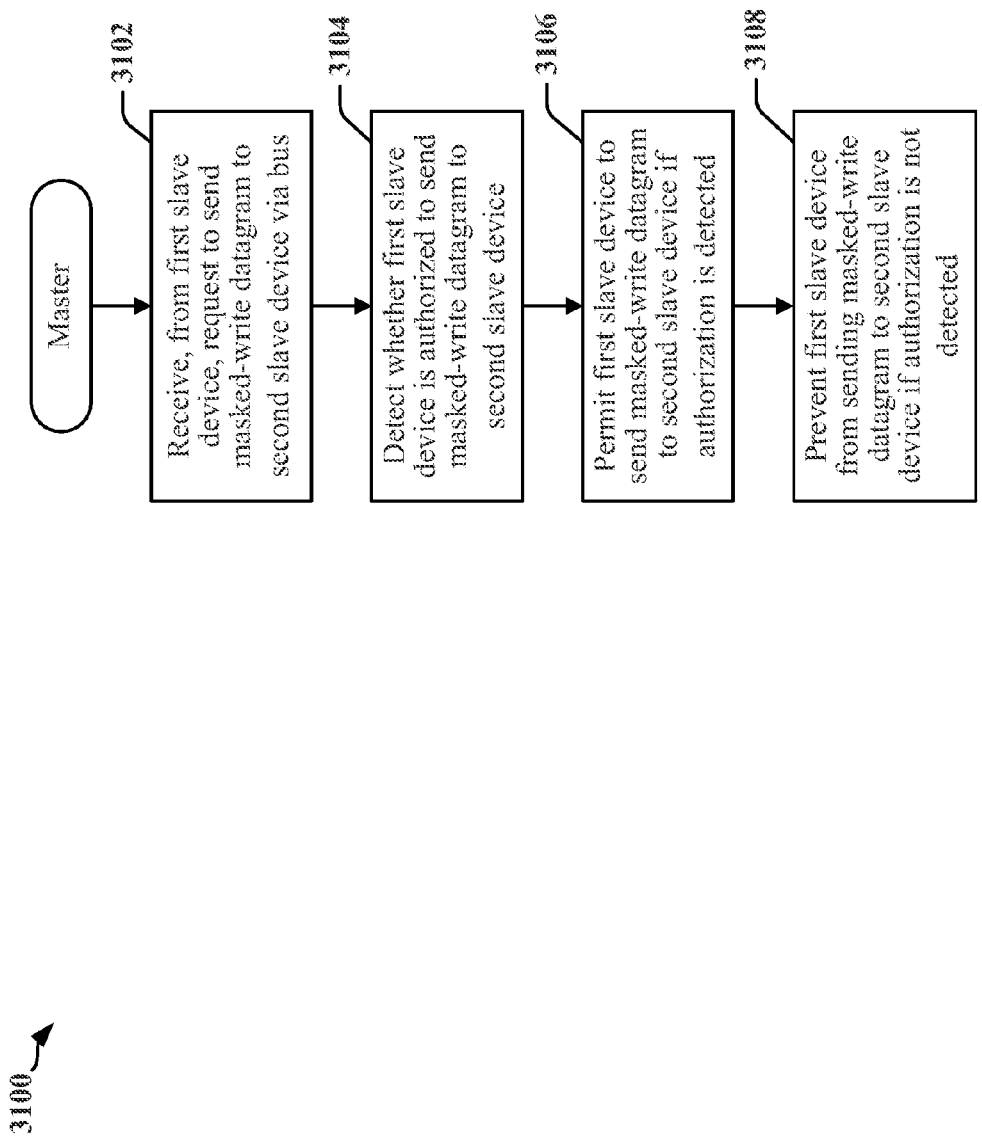
FIG. 31 is a flow chart of a method for facilitating data communication on a bus.

FIG. 31 is a flow chart 3100 of a method for facilitating data communication on a bus. The method may be performed at a master device.

The master device may receive, from a first slave device, a request to send a masked-write datagram to a second slave device via the bus 3102. The masked-write datagram may be addressed to a radio frequency front end (RFFE) register of the second slave device. The masked-write datagram may include a mask field identifying at least one bit to be changed in the RFFE register and a data field providing a value of the at least one bit to be changed in the RFFE register. The mask field may further identify a remaining set of bits to be left unchanged in the RFFE register of the second slave device. In an aspect, the mask field is a bit index field identifying a bit position to be changed in the RFFE register of the second slave device and the data field is a bit value field providing a bit value for the bit position identified in the bit index field.

The master device may detect whether the first slave device is authorized to send the masked-write datagram to the second slave device 3104. For example, the master device may compare the requested masked-write datagram communication against a system definition of allowed interactions between slave devices. In an aspect, the master device may communicate with a security entity to determine if the masked-write datagram communication is allowed.

If authorization is detected, the master device may permit the first slave device to send the masked-write datagram to the second slave device 3106. In an aspect, the master device may permit by notifying the first slave device that the first slave device is authorized to send the masked-write datagram. Alternatively, the master device may permit by taking no specific action.

If authorization is not detected, the master device may prevent the first slave device from sending the masked-write datagram to the second slave device 3108. In an aspect, the master device may prevent by notifying the first slave device that the first slave device is not authorized to send the masked-write datagram. Additionally and/or alternatively, the master device may prevent by issuing a bus park cycle on the bus to block the sending of the masked-write datagram.

Figure 32:
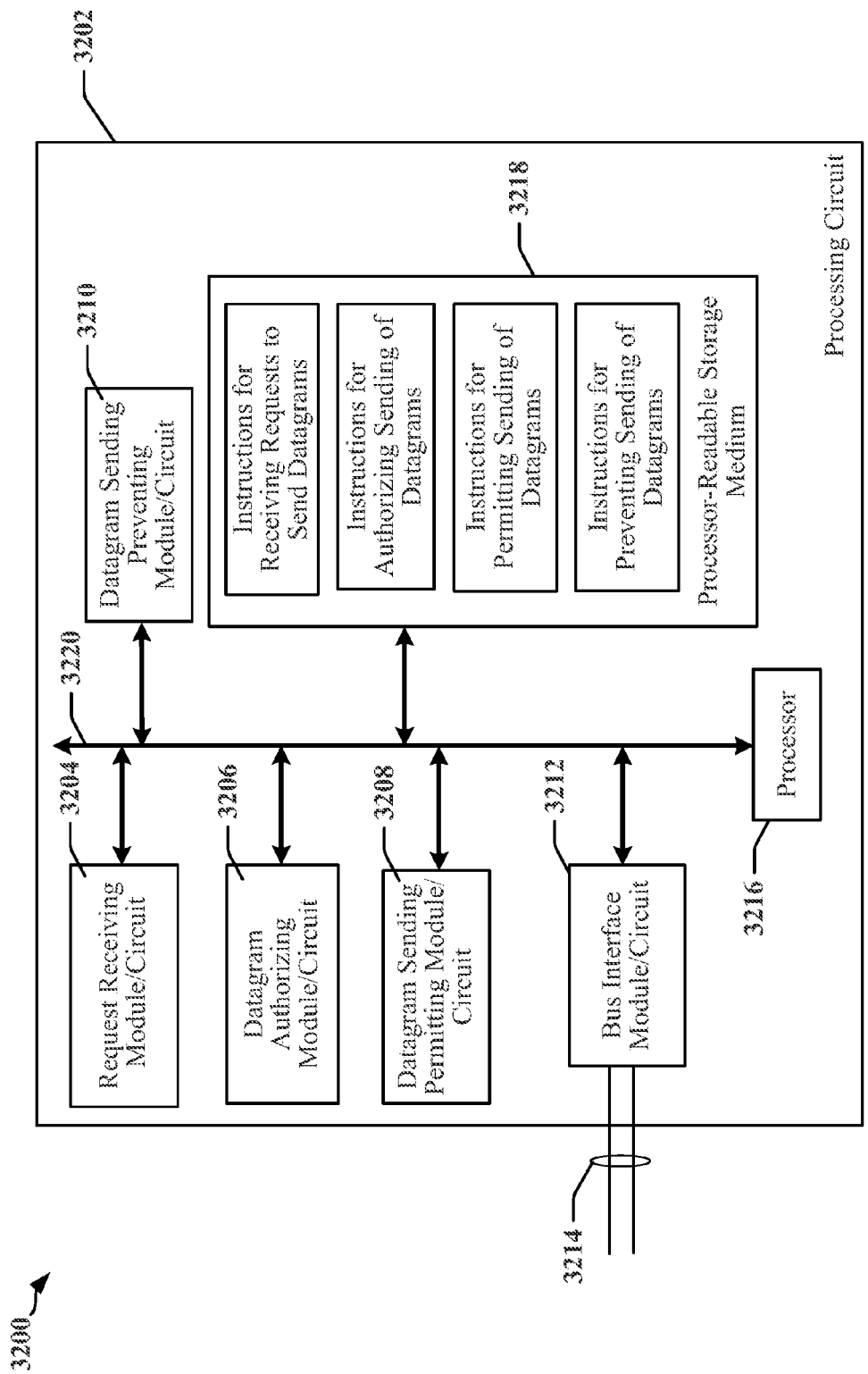
FIG. 32 is a diagram illustrating a simplified example of a hardware implementation for a master apparatus and employing a processing circuit adapted according to certain aspects disclosed herein.

FIG. 32 is a diagram illustrating a simplified example of a hardware implementation for a master apparatus 3200 employing a processing circuit 3202. Examples of operations performed by the master apparatus 3200 include the operations described above with respect to the flow charts of FIGS. 30 and 31. The processing circuit typically has a processor 3216 that may include one or more of a microprocessor, microcontroller, digital signal processor, a sequencer and a state machine. The processing circuit 3202 may be implemented with a bus architecture, represented generally by the bus 3220. The bus 3220 may include any number of interconnecting buses and bridges depending on the specific application of the processing circuit 3202 and the overall design constraints. The bus 3220 links together various circuits including one or more processors and/or hardware modules, represented by the processor 3216, the modules or circuits 3204, 3206, 3208, 3210, bus interface circuits 3212 configurable to support communication over connectors or wires 3214 and the computer-readable storage medium 3218. The bus 3220 may also link various other circuits such as timing sources, peripherals, voltage regulators, and power management circuits, which are well known in the art, and therefore, will not be described any further.

The processor 3216 is responsible for general processing, including the execution of software/instructions stored on the computer-readable storage medium 3218. The software/instructions, when executed by the processor 3216, causes the processing circuit 3202 to perform the various functions described supra for any particular apparatus. The computer-readable storage medium may also be used for storing data that is manipulated by the processor 3216 when executing software, including data decoded from symbols transmitted over the connectors or wires 3214, which may be configured as data lanes and clock lanes. The processing circuit 3202 further includes at least one of the modules/circuits 3204, 3206, 3208, and 3210. The modules/circuits 3204, 3206, 3208, and 3210 may be software modules running in the processor 3216, resident/stored in the computer-readable storage medium 3218, one or more hardware modules coupled to the processor 3216, or some combination thereof. The modules/circuits 3204, 3206, 3208, and/or 3210 may include microcontroller instructions, state machine configuration parameters, or some combination thereof.

In one configuration, the apparatus 3200 for communication includes a request receiving module/circuit 3204 that is configured to, receive, from a first slave device, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register. The apparatus 3200 further includes a datagram authorizing module/circuit 3206 that is configured to, detect whether the first slave device is authorized to send the masked-write datagram to the second slave device. The apparatus 3200 also includes a datagram sending permitting module/circuit 3208 that is configured to, permit the first slave device to send the masked-write datagram to the second slave device if authorization is detected. The apparatus 3200 further includes a datagram sending preventing module/circuit 3210 that is configured to, prevent the first slave device from sending the masked-write datagram to the second slave device if authorization is not detected.

Figure 33:
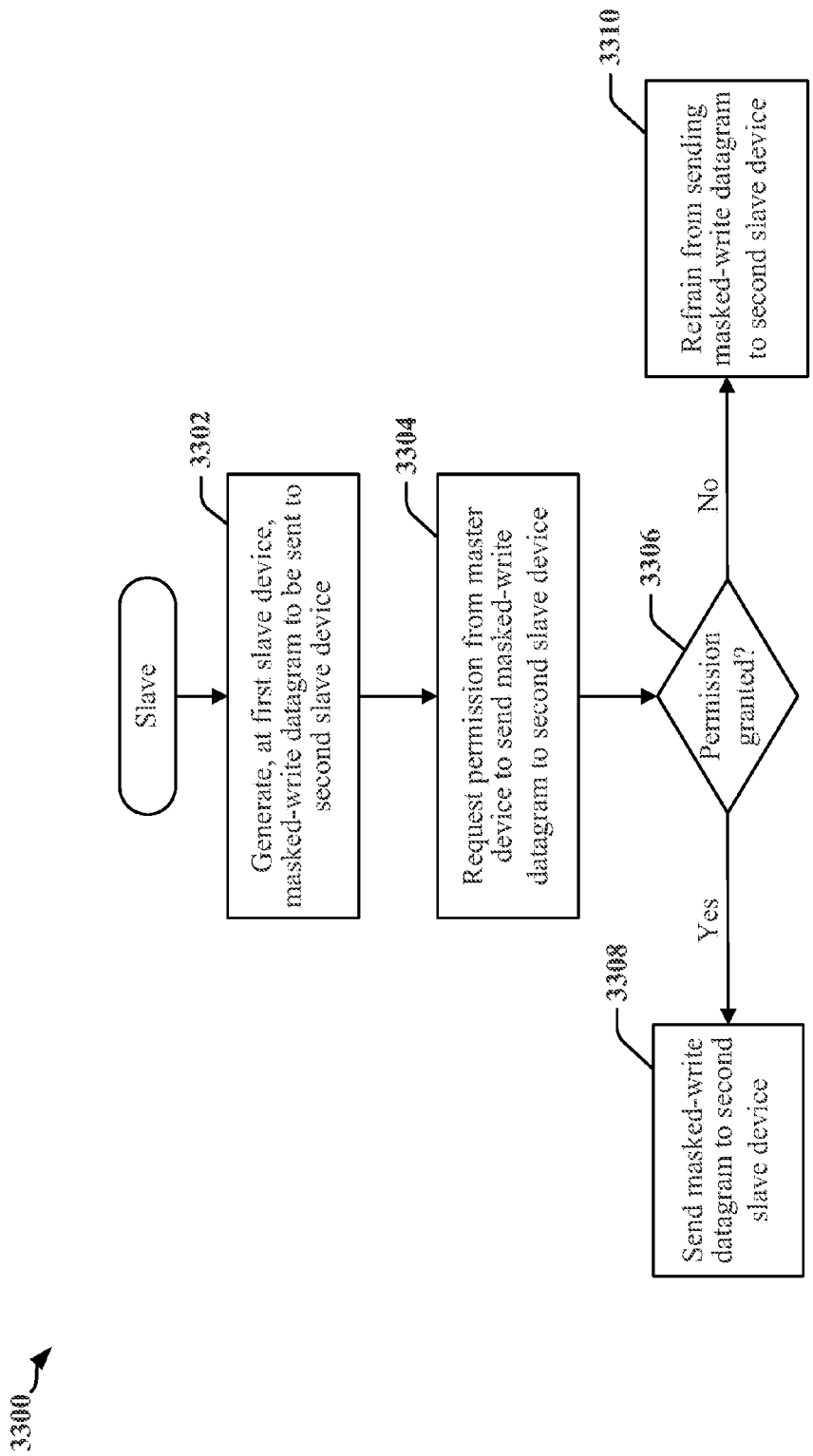
FIG. 33 is a flow chart of a method for communicating data between slave devices on a bus.

Exemplary Method and Device for Communicating Data from a First Slave Device to a Second Slave Device on a Bus FIG. 33 is a flow chart 3300 of a method for communicating data between slave devices on a bus. The method may be performed at a first slave device.

The first slave device may generate a masked-write datagram to be sent to the second slave device via the bus 3302. The masked-write datagram may be addressed to a radio frequency front end (RFFE) register of the second slave device. The masked-write datagram may include a mask field identifying at least one bit to be changed in the (RFFE) register and a data field providing a value of the at least one bit to be changed in the RFFE register. The mask field may further identify a remaining set of bits to be left unchanged in the RFFE register of the second slave device. In an aspect, the mask field is a bit index field identifying a bit position to be changed in the RFFE register of the second slave device and the data field is a bit value field providing a bit value for the bit position identified in the bit index field.

The first slave device may request permission from a master device to send the masked-write datagram to the second slave device 3304. The first slave device may then detect if permission is granted by the master device to send the masked-write datagram 3306.

For example, the first slave device may detect that permission is granted when the first slave device receives a notification from the master device that the first slave device is permitted to send the masked-write datagram. In another example, the first slave device may detect that permission is granted if the first slave device does not receive a response to the request after a threshold amount of time has elapsed. Accordingly, if permitted by the master device, the first slave device may send the masked-write datagram to the second slave device 3308.

In a further example, the first slave device may detect that permission is not granted when the first slave device receives a notification from the master device that the first slave device is not permitted to send the masked-write datagram. In yet a further example, the first slave device may detect that permission is not granted by observing a bus park cycle issued by the master device on the bus to block the sending of the masked-write datagram. Accordingly, if not permitted by the master device, the first slave device may refrain from sending the masked-write datagram to the second slave device 3310.

Figure 34:
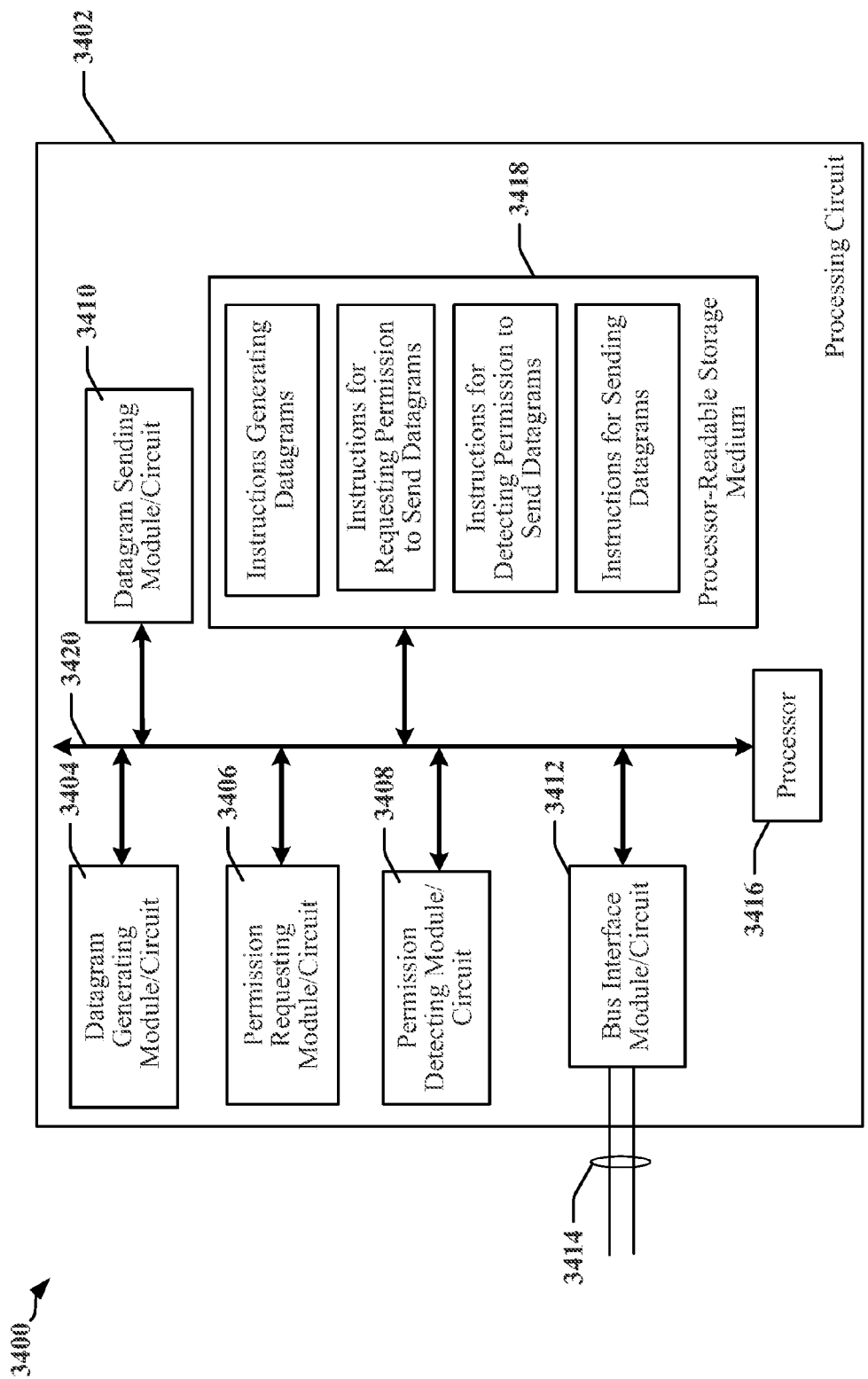
FIG. 34 is a diagram illustrating a simplified example of a hardware implementation for a slave apparatus and employing a processing circuit adapted according to certain aspects disclosed herein.

FIG. 34 is a diagram illustrating a simplified example of a hardware implementation for a slave apparatus 3400 employing a processing circuit 3402. Examples of operations performed by the slave apparatus 3400 include the operations described above with respect to the flow charts of FIGS. 30 and 33. The processing circuit typically has a processor 3416 that may include one or more of a microprocessor, microcontroller, digital signal processor, a sequencer and a state machine. The processing circuit 3402 may be implemented with a bus architecture, represented generally by the bus 3420. The bus 3420 may include any number of interconnecting buses and bridges depending on the specific application of the processing circuit 3402 and the overall design constraints. The bus 3420 links together various circuits including one or more processors and/or hardware modules, represented by the processor 3416, the modules or circuits 3404, 3406, 3408, 3410, bus interface circuits 3412 configurable to support communication over connectors or wires 3414 and the computer-readable storage medium 3418. The bus 3420 may also link various other circuits such as timing sources, peripherals, voltage regulators, and power management circuits, which are well known in the art, and therefore, will not be described any further.

The processor 3416 is responsible for general processing, including the execution of software/instructions stored on the computer-readable storage medium 3418. The software/instructions, when executed by the processor 3416, causes the processing circuit 3402 to perform the various functions described supra for any particular apparatus. The computer-readable storage medium may also be used for storing data that is manipulated by the processor 3416 when executing software, including data decoded from symbols transmitted over the connectors or wires 3414, which may be configured as data lanes and clock lanes. The processing circuit 3402 further includes at least one of the modules/circuits 3404, 3406, 3408, and 3410. The modules/circuits 3404, 3406, 3408, and 3410 may be software modules running in the processor 3416, resident/stored in the computer-readable storage medium 3418, one or more hardware modules coupled to the processor 3416, or some combination thereof. The modules/circuits 3404, 3406, 3408, and/or 3410 may include microcontroller instructions, state machine configuration parameters, or some combination thereof.

In one configuration, the apparatus 3400 for communication includes a datagram generating module/circuit 3404 that is configured to, generate, at a first slave device, a masked-write datagram to be sent to a second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register. The apparatus 3400 further includes a permission requesting module/circuit 3406 that is configured to, request permission from a master device to send the masked-write datagram to the second slave device. The apparatus 3400 also includes a permission detecting module/circuit 3408 that is configured to, detect whether the first slave device is permitted to send the masked-write datagram to the second slave device. The apparatus 3400 further includes a datagram sending module/circuit 3410 that is configured to, send the masked-write datagram to the second slave device if permitted by the master device and refrain from sending the masked-write datagram to the second slave device if not permitted by the master device.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a master device for facilitating data communication on a bus, comprising:
   receiving, from a first slave device, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register;
   detecting whether the first slave device is authorized to send the masked-write datagram to the second slave device; and
   permitting the first slave device to send the masked-write datagram to the second slave device if authorization is detected.

2. The method of claim 1, wherein the permitting includes notifying the first slave device that the first slave device is authorized to send the masked-write datagram.

3. The method of claim 1, further including:
   preventing the first slave device from sending the masked-write datagram to the second slave device if authorization is not detected.

4. The method of claim 3, wherein the preventing includes notifying the first slave device that the first slave device is not authorized to send the masked-write datagram.

5. The method of claim 3, wherein the preventing includes issuing a bus park cycle on the bus to block the sending of the masked-write datagram.

6. The method of claim 1, wherein the mask field further identifies a remaining set of bits to be left unchanged in the RFFE register of the second slave device.

7. The method of claim 1, wherein:
   the mask field is a bit index field identifying a bit position to be changed in the RFFE register of the second slave device; and
   the data field is a bit value field providing a bit value for the bit position identified in the bit index field.

8. A master device for facilitating data communication on a bus, comprising:
   a bus interface; and
   a processing circuit configured to:
      receive, from a first slave device via the bus interface, a request to send a masked-write datagram to a second slave device via the bus, wherein the masked-write datagram is addressed to a radio frequency front end (RFFE) register of the second slave device, the masked-write datagram including a mask field identifying at least one bit to be changed in the RFFE register and a data field providing a value of the at least one bit to be changed in the RFFE register,
      detect whether the first slave device is authorized to send the masked-write datagram to the second slave device, and
      permit the first slave device to send the masked-write datagram to the second slave device if authorization is detected.

9. The master device of claim 8, wherein the processing circuit configured to permit is configured to notify the first slave device that the first slave device is authorized to send the masked-write datagram.

10. The master device of claim 8, wherein the processing circuit is further configured to:
   prevent the first slave device from sending the masked-write datagram to the second slave device if authorization is not detected.

11. The master device of claim 10, wherein the processing circuit configured to prevent is configured to notify the first slave device that the first slave device is not authorized to send the masked-write datagram.

12. The master device of claim 10, wherein the processing circuit configured to prevent is configured to issue a bus park cycle on the bus to block the sending of the masked-write datagram.

13. The master device of claim 8, wherein the mask field further identifies a remaining set of bits to be left unchanged in the RFFE register of the second slave device.

14. The master device of claim 8, wherein:
- the mask field is a bit index field identifying a bit position to be changed in the RFFE register of the second slave device; and
- the data field is a bit value field providing a bit value for the bit position identified in the bit index field.

15. A method performed at a first slave device for communicating data to a second slave device via a bus, comprising:
- generating, at the first slave device, a masked-write datagram to be sent to the second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register;
- requesting permission from a master device to send the masked-write datagram to the second slave device;
- detecting whether the permission is granted; and
- sending the masked-write datagram to the second slave device if permitted by the master device.

16. The method of claim 15, wherein the detecting includes receiving a notification from the master device that the first slave device is permitted to send the masked-write datagram.

17. The method of claim 15, further including refraining from sending the masked-write datagram to the second slave device if not permitted by the master device.

18. The method of claim 17, wherein the detecting includes receiving a notification from the master device that the first slave device is not permitted to send the masked-write datagram.

19. The method of claim 17, wherein the detecting includes observing a bus park cycle issued by the master device on the bus to block the sending of the masked-write datagram.

20. The method of claim 15, wherein the mask field further identifies a remaining set of bits to be left unchanged in the RFFE register of the second slave device.

21. The method of claim 15, wherein:
- the mask field is a bit index field identifying a bit position to be changed in the RFFE register of the second slave device; and
- the data field is a bit value field providing a bit value for the bit position identified in the bit index field.

22. A slave device for communicating data to a second slave device via a bus, comprising:
- a bus interface; and
- a processing circuit configured to:
  - generate, at the slave device, a masked-write datagram to be sent to the second slave device via the bus, wherein the masked-write datagram is addressed to a radio frequency front end (RFFE) register of the second slave device, the masked-write datagram including a mask field identifying at least one bit to be changed in the (RFFE) register and a data field providing a value of the at least one bit to be changed in the RFFE register,
  - request permission from a master device to send the masked-write datagram to the second slave device,
  - detect whether the permission is granted, and
  - send the masked-write datagram to the second slave device via the bus interface if permitted by the master device.

23. The slave device of claim 22, wherein the processing circuit is further configured to receive a notification from the master device that the slave device is permitted to send the masked-write datagram.

24. The slave device of claim 22, wherein the processing circuit is further configured to refrain from sending the masked-write datagram to the second slave device if not permitted by the master device.

25. The slave device of claim 24, wherein the processing circuit is further configured to receive a notification from the master device that the slave device is not permitted to send the masked-write datagram.

26. The slave device of claim 24, wherein the processing circuit is further configured to observe a bus park cycle issued by the master device on the bus to block the sending of the masked-write datagram.

27. The slave device of claim 22, wherein the mask field further identifies a remaining set of bits to be left unchanged in the RFFE register of the second slave device.

28. The slave device of claim 22, wherein:
- the mask field is a bit index field identifying a bit position to be changed in the RFFE register of the second slave device; and
- the data field is a bit value field providing a bit value for the bit position identified in the bit index field.

* * * * *